US009310795B2

(12) United States Patent  
Zondler et al.

(10) Patent No.: US 9,310,795 B2  
(45) Date of Patent: Apr. 12, 2016

(54) SAFETY CONTROLLER AND METHOD FOR CONTROLLING AN AUTOMATED INSTALLATION

(75) Inventors: Martin Zondler, Ostfildern (DE); Helmut Ehrhart, Stuttgart (DE); Harald Foerster, Suessen (DE)

(73) Assignee: PILZ GMBH & CO. KG, Ostfildern (DE)

( * ) Notice: Subject to any disclaimer, the term of this patent is extended or adjusted under 35 U.S.C. 154(b) by 0 days.

(21) Appl. No.: 13/113,266

(22) Filed: May 23, 2011

(65) Prior Publication Data

US 2012/0016495 A1 Jan. 19, 2012

Related U.S. Application Data

(63) Continuation of application No. PCT/EP2009/008265, filed on Nov. 20, 2009.

(30) Foreign Application Priority Data

Nov. 25, 2008 (DE) .......................... 10 2008 060 005

(51) Int. Cl.
  *G05B 11/01* (2006.01)
  *G01D 3/00* (2006.01)
  (Continued)

(52) U.S. Cl.
  CPC .............. *G05B 19/0428* (2013.01); *G05B 9/03* (2013.01); *G05B 2219/23292* (2013.01); *G05B 2219/31455* (2013.01); *G05B 2219/31469* (2013.01); *G05B 2219/34465* (2013.01)

(58) Field of Classification Search
  CPC ........ G05B 9/02; G05B 9/03; G05B 19/0428; G05B 19/058; G05B 2219/2642; G05B 23/02; G05B 19/406; G05B 23/02291; G05B 2219/14006; G05B 2219/14116; G05B 2219/31211; G05B 2219/32356; G05B 2219/32408; G05B 2219/33285; G05B 2219/33297; G05B 2219/33331; G05B 2219/34294; G05B 19/34493; G05B 2219/31455; G05B 2219/31469; G05B 2219/23292

USPC ......... 700/12, 4, 18, 19, 20, 79, 86, 247, 248; 702/183, 108, 122

See application file for complete search history.

(56) References Cited

U.S. PATENT DOCUMENTS 5,768,119 A * 6/1998 Havekost et al. ................. 700/4  
6,647,301 B1 * 11/2003 Sederlund et al. .............. 700/79  
(Continued)

FOREIGN PATENT DOCUMENTS

CN 101031852 A 9/2007  
CN 101156119 A 4/2008  
(Continued)

OTHER PUBLICATIONS

European Standard EN 954-1; Safety-related parts of control systems Part 1: General principles for design; Mar. 1997; 34 pages.  
(Continued)

*Primary Examiner* — Carlos Ortiz Rodriguez  
*Assistant Examiner* — Jason Lin  
(74) *Attorney, Agent, or Firm* — Harness, Dickey & Pierce, P.L.C.

(57) ABSTRACT

A safety controller for controlling an automated installation in accordance with a user program has a control unit receiving a plurality of control input signals from a plurality of sensors. The control unit produces a plurality of control output signals on the basis of the control input signals in accordance with a user program. The control output signals drive actuators in order to adopt one of a plurality of installation states of the automated installation. An installation diagnosis evaluation unit produces a number of installation state signals representing which one of the plurality of installation states is existent at a defined moment of time. In addition, a system diagnosis evaluation unit produces a number of system state signals, with each system state signal representing one from a plurality of operational system states of the controller system, which is formed by the control unit and its connected sensors and actuators, at the defined moment of time. A diagnosis report unit produces a number of diagnosis signals depending on the installation state signals, depending on the system state signals, and depending on predefined associations between said installation states and said operational system states. The diagnosis signals represent a number of diagnosis reports which are a result of a combination of both the installation states and associated operational system states. A display unit displays the diagnosis reports in response to the diagnosis signals.

16 Claims, 11 Drawing Sheets

(51) Int. Cl.
*G06F 11/30* (2006.01)
*G05B 19/042* (2006.01)
*G05B 9/03* (2006.01)

(56) References Cited

U.S. PATENT DOCUMENTS

| | | | |
|---|---|---|---|
| 6,775,707 B1 * | 8/2004 | Bennett et al. | 709/233 |
| 7,030,747 B2 | 4/2006 | Scott et al. | |
| 7,275,062 B2 * | 9/2007 | Deitz et al. | |
| 7,330,768 B2 * | 2/2008 | Scott et al. | 700/79 |
| 7,464,219 B2 * | 12/2008 | Hinrichs et al. | 711/112 |
| 7,581,434 B1 * | 9/2009 | Discenzo et al. | 73/53.01 |
| 7,813,813 B2 * | 10/2010 | Muneta et al. | 700/1 |
| 7,813,820 B2 * | 10/2010 | Opem et al. | 700/79 |
| 7,865,251 B2 * | 1/2011 | Law et al. | 700/19 |
| 7,991,582 B2 | 8/2011 | Longsdorf et al. | |
| 8,024,053 B2 * | 9/2011 | Murakami | 700/79 |
| 8,074,278 B2 * | 12/2011 | Law et al. | 726/23 |
| 8,401,819 B2 | 3/2013 | Kavaklioglu | |
| 8,413,856 B2 * | 4/2013 | Williams et al. | 222/389 |
| 8,515,563 B2 * | 8/2013 | Weddingfeld | G05B 19/052 700/2 |
| 8,534,499 B2 * | 9/2013 | Williams et al. | 222/55 |
| 2003/0014536 A1 * | 1/2003 | Christensen et al. | 709/238 |
| 2004/0148130 A1 * | 7/2004 | Scott et al. | 702/183 |
| 2004/0193290 A1 * | 9/2004 | Ott et al. | 700/18 |
| 2005/0222691 A1 * | 10/2005 | Glas et al. | 700/19 |
| 2008/0004723 A1 * | 1/2008 | Fax et al. | 700/51 |
| 2008/0082184 A1 * | 4/2008 | Murakami | 700/79 |
| 2008/0208373 A1 * | 8/2008 | Thurau | 700/80 |
| 2008/0255681 A1 | 10/2008 | Scott et al. | |
| 2012/0095573 A1 * | 4/2012 | Moosmann | 700/7 |

FOREIGN PATENT DOCUMENTS

| | | |
|---|---|---|
| DE | 198 41 194 A1 | 2/2000 |
| DE | 199 11 848 A1 | 9/2000 |
| DE | 10 2004 003 605 A1 | 11/2004 |
| DE | 10 2005 008 517 A1 | 9/2005 |
| DE | 10 2004 020 994 A1 | 11/2005 |
| DE | 11 2005 001 031 T5 | 6/2007 |
| DE | 10 2007 060 281 A1 | 6/2009 |
| EP | 0 482 523 A2 | 4/1992 |
| EP | 0 805 382 A1 | 11/1997 |
| GB | 2 398 395 A | 8/2004 |
| GB | 2 426 355 A | 11/2006 |

OTHER PUBLICATIONS

International Standard CEI IEC 61508-2; Functional safety of electrical/electronic/programmable electronic safety-related systems—Part 2: Requirements for electrical/electronic/programmable electronic safety-related systems; 2000; 152 pages.

International Standard EN ISO 13849-1; Safety of machinery—Safety-related parts of control systems—Part 1: General principles for design; Nov. 2006; 97 pages.

* cited by examiner

SAFETY CONTROLLER AND METHOD FOR CONTROLLING AN AUTOMATED INSTALLATION

CROSS REFERENCES TO RELATED APPLICATIONS

This application is a continuation of international patent application PCT/EP2009/008265 filed on Nov. 20, 2009 designating the U.S., which international patent application has been published in German language and claims priority from German patent application DE 10 2008 060 005.9 filed on Nov. 25, 2008. The entire contents of these priority applications are incorporated herein by reference.

BACKGROUND OF THE INVENTION

The present invention relates to a safety controller and a method for controlling an automated installation, and more particularly to a safety controller and a method providing enhanced diagnosis capabilities.

A safety controller within the meaning of the present invention is an apparatus or an arrangement which receives input signals delivered by sensors and produces output signals therefrom by means of logic combinations and sometimes further signal or data processing steps. The output signals can then be supplied to actuators, which then effect desired actions or reactions in the installation on the basis of the input signals.

A preferred area of application for safety controllers of this kind is in the field of machine safety for monitoring emergency-off pushbuttons, two-hand controllers, guard doors or light grids. Such sensors are used in order to safeguard a machine, for example, which presents a hazard to humans or material goods during operation. When the guard door is opened or when the emergency-off pushbutton is operated, a respective signal is produced which is supplied to the safety controller as an input signal. In response thereto, the safety controller then uses an actuator, for example, to shut down that part of the machine which is presenting the hazard.

In contrast to a "normal" controller, a characteristic of a safety controller is that the safety controller always ensures a safe state of the installation or machine presenting the hazard, even if a malfunction occurs in the safety controller or in a device connected to it. Extremely high demands are therefore put on safety controllers in terms of their own failsafety, which results in considerable complexity for development and manufacture.

Usually, safety controllers require particular approval from competent supervisory authorities, such as by the professional associations or the TÜV in Germany, before they are used. In this case, the safety controller must observe prescribed safety standards as set down, by way of example, in the European Standard EN 954-1 or a comparable standard, such as standard IEC 61508 or standard EN ISO 13849-1. In the following, a safety controller is therefore understood to mean an arrangement or an apparatus which complies at least with safety category 3 of the cited European standard EN 954-1.

A programmable safety controller provides the user with the opportunity to individually define the logic combinations and possibly further signal or data processing steps according to his needs using a piece of software that is typically called the user program. This results in a great deal of flexibility in comparison with earlier solutions, in which the logic combinations were established by defined hardware wiring between various safety components. By way of example, a user program can be written using a commercially available personal computer (PC) and using appropriately set-up software programs.

The user program executed in the safety controller defines the process which runs on the installation controlled by the safety controller. This process is monitored by means of process diagnosis. The installation diagnosis involves a check to determine which of a plurality of installation states for the system to be controlled is present at a defined time. Hence, both admissible and inadmissible installation states are detected. One aim is to detect inadmissible installation states, what are known as faults, and to display them on a display unit, so that the operating personnel on the system to be controlled can rectify the fault. Usually, such a display unit is a display unit integrated in the control console of the system to be controlled.

Overall, the installation diagnosis and the associated display of the detected or determined installation states present a process map on the display unit which comprises both the admissible and the inadmissible installation states.

The installation states detected by means of the installation diagnosis are established by virtue of logic requests, inter alia, which is why determined inadmissible installation states may be referred to as logical errors in the following. These logic requests involve threshold value or area comparisons, by way of example, being performed for variables detected by means of sensors, i.e. the respective measured value of the detected variable is compared with one or more threshold values.

One example is monitoring the filling level of a container. To this end, the container has associated a filling level sensor. The filling level sensor produces a filling level signal which represents the detected filling level of the container. Usually, the filling level signal is a voltage, the value of the voltage being proportional to the filling level which is present in the container. Depending on whether the further processing takes place in analog or digital fashion, this voltage value itself or a variable derived therefrom is compared with a threshold value. If this comparison determines that the threshold value has been exceeded, this may be interpreted as "container full" and no diagnosis report is created. If, by contrast, the comparison determines that the threshold value has not been reached, this may be interpreted as "container empty". This is assumed to be an inadmissible installation state, i.e. an error state is present. The display unit is used to display a diagnosis report which represents this inadmissible installation state. Hence, the display unit is used to present a logical error.

There are now two possible situations. In the first situation, the container is actually empty. In this case, the determined installation state, i.e. the determined logical error, is based on reality. The diagnosis report presented on the display unit correctly reproduces reality. The container needs to be filled by the operating personnel, such as maintenance personnel.

However, a second situation is also conceivable, in which the container is actually not empty. In this case, the determined installation state, i.e. the determined logical error, is not based on reality and the diagnosis report presented on the display unit does not correctly reproduce reality. This may be the case, by way of example, when the filling level sensor is faulty or there is an error in the wiring connecting the filling level sensor to the safety controller, or an error in the safety controller itself. In all cases, a diagnosis report is displayed which indicates that the container is empty even though the container is full. The display of this diagnosis report is not only misleading, the operating personnel is either not provided with any advice of the actual cause that led to the installation diagnosis determining the installation state on which the displayed diagnosis report is based.

The above thoughts show that the diagnosis measures used in the known safety controllers and methods are still not optimal.

SUMMARY OF THE INVENTION

It is therefore an object of the present invention to provide a safety controller and a method offering better information to operating personnel about faults which might occur during operation of the system, and to give them better support for rectifying these faults.

According to an aspect of the invention, there is provided a safety controller for controlling an automated installation in accordance with a user program that defines a plurality of installation states of the installation, said installation having a plurality of installation hardware components each comprising a number of sensors and a number of actuators connected to the safety controller so as to form a controller system, the safety controller comprising a control unit to which a plurality of control input signals from the plurality of sensors are supplied, wherein the control unit is designed to produce a plurality of control output signals on the basis of the control input signals in accordance with the user program, wherein the plurality of control output signals are used to actuate the plurality of actuators in order to adopt one of the plurality of installation states; a display unit for displaying diagnosis reports; an installation diagnosis evaluation unit to which a number of installation diagnosis input signals are supplied, wherein the installation diagnosis evaluation unit produces a number of installation state signals on the basis of the installation diagnosis input signals, the installation state signals representing which one of the plurality of installation states is existent at a defined moment of time; a system diagnosis evaluation unit to which a number of system diagnosis input signals are supplied, wherein the system diagnosis evaluation unit produces a number of system state signals on the basis of the number of system diagnosis input signals, with each system state signal representing one from a plurality of operational system states of the controller system at the defined moment of time; and a diagnosis report unit to which the installation state signals and the system state signals are supplied; wherein the diagnosis report unit produces a number of diagnosis signals depending on the installation state signals, depending on the system state signals, and depending on predefined associations between said installation states and said operational system states; wherein said diagnosis signals represent a number of diagnosis reports, which are a result of a combination of both the installation states and associated operational system states; and wherein the diagnosis signals are supplied to the display unit for the purpose of displaying the diagnosis reports.

According to another aspect, there is provided a method for controlling an automated installation in accordance with a user program that defines a plurality of installation states of the installation, said installation having a plurality of installation hardware components each comprising a number of sensors and a number of actuators connected to a safety controller so as to form a controller system, the method comprising the steps of receiving a plurality of control input signals from the plurality of sensors at the safety controller; producing a plurality of control output signals in response to the control input signals in accordance with the user program executed on the safety controller, and providing the control output signals to the plurality of actuators in order to adopt one of the plurality of installation states; producing a number of installation state signals representing which one of the plurality of installation states is existent at a defined moment of time; producing a number of system state signals representing a plurality of operational system states of the controller system at the defined moment of time; producing a number of diagnosis signals depending on the installation state signals, depending on the system state signals, and depending on predefined associations between said installation states and said operational system states, said diagnosis signals representing a number of diagnosis reports which are a result of a combination of both the installation states and associated operational system states; and supplying said diagnosis signals to a display unit for the purpose of displaying the diagnosis reports.

There is also provided a storage medium comprising a computer program having program code designed to be executed on a safety controller for controlling an automated installation having a plurality of installation states, said installation having a plurality of installation hardware components each comprising a number of sensors and a number of actuators connected to a safety controller so as to form a controller system, and the computer program being designed to carry out a method comprising the steps of receiving a plurality of control input signals from the plurality of sensors at the safety controller; producing a plurality of control output signals in response to the control input signals; and providing the control output signals to the plurality of actuators in order to adopt one of the plurality of installation states; producing a number of installation state signals representing which one of the plurality of installation states is existent at a defined moment of time; producing a number of system state signals representing a plurality of operational system states of the controller system at the defined moment of time; producing a number of diagnosis signals depending on the installation state signals, depending on the system state signals, and depending on predefined associations between said installation states and said operational system states, said diagnosis signals representing a number of diagnosis reports which are a result of a combination of both the installation states and associated operational system states; and supplying said diagnosis signals to a display unit for the purpose of displaying the diagnosis reports.

The new safety controller and the method are based on the idea of combining installation diagnosis with system diagnosis. To this end, an installation diagnosis evaluation unit is provided which is designed to receive a number of installation diagnosis input signals supplied to said installation diagnosis evaluation unit as a basis for determining which of a plurality of installation states for the installation to be controlled is present at a first defined time. Overall, there may be a number of installation states determined at the first defined time. In addition, a system diagnosis evaluation unit is provided which is designed to receive a number of system diagnosis input signals which are supplied to said system diagnosis evaluation unit as a basis for determining which of a plurality of system states for the safety controller is present at a second defined time. Overall, there may be a number of system states determined at the second defined time.

A system state of the safety controller is any state which the safety controller as such, i.e. the physical unit where logic components such as processors and memories required for implementing control tasks are accommodated, and which components of the installation electrically connected to said physical unit, such as sensors, actuators or what are known as signaling devices, such as example mode selection switches, can adopt. This definition also includes all wiring. With a view to diagnosis, primarily those system states in which an error occurs on one of the components listed above are of interest. These errors are referred to as physical errors.

The installation diagnosis and system diagnosis are combined by providing a diagnosis report for a determined installation state on the basis of this installation state itself and on the basis of a number of system states associated with said installation state.

The effect achieved by the approach is that the provision of a diagnosis report simultaneously takes account of the installation state itself and of system states associated with this installation state. This means that the provision of the diagnosis report covers not only the determined installation state itself, but also any system states which cause said installation state. In other words: the provision of the diagnosis report takes account not only of the logical error, but also of any physical errors causing the latter.

Simultaneous consideration of an installation state and of the related system states forms the basis for comprehensive instruction of the operating personnel about faults which occur during the operation of an installation. The operating personnel can be notified of the physical error on which a logical error is based. This allows the operating personnel to immediately take measures to rectify the physical error and hence the fault.

At the same time, the approach increases the reliability for any diagnosis report which represents a determined installation state. If a display unit is used to display a diagnosis report which merely comprises information relating to a determined installation state, i.e. relating to a logical error, and comprises no advice of an underlying system state and hence of a physical error causing the logical error, this means—as a result of the approach—that the determined installation state is correctly reproducing reality and there is no physical cause of error for the diagnosis report. This is because the safety controller needs to be implemented such that every conceivable physical error is detected in order to achieve failsafe control.

The approach therefore achieves better instruction of the operating personnel about faults which occur during operation of an installation and better assistance in rectifying these faults.

Where the term operating personnel is used in connection with the safety controller and the method according to the invention, this should be understood to mean not only conventional operators on an installation, but also maintenance personnel, set-up personnel, the programmer of a user program or the manufacturer of the safety controller.

According to the above description, the installation diagnosis evaluation unit is designed to determine which of a plurality of installation states of the installation to be controlled is present at a first defined time, whereas the system diagnosis evaluation unit is designed to determine which of a plurality of system states for the safety controller is present at a second defined time. The distinction into a first and a second defined time takes account of the following circumstance: a programmable safety controller is a microprocessor-based discrete-time system operating at a defined clock rate. For this reason, signals with a continuous presence over time, i.e. analog signals, as are provided by sensors, for example, need to be converted into digital signals so that they can actually be processed in the safety controller. The conversion takes place at times which are prescribed by the clock rate. It may therefore arise that the requests which can be used to determine the presence of the respective state are made at slightly different times for an installation state and an associated system state. By way of example, this is the case when a variable which can be evaluated for the installation state is provided in the safety controller quicker than a variable which can be evaluated for the system state. Consequently, the installation state and the system state are determined in the safety controller at different times. Usually, these two times lie within a small defined time interval, the length of which corresponds to a multiple of the period prescribed by the clock rate. In this case, the first defined time and the second defined time are very close together, and the system state and the installation state are determined more or less simultaneously. The consideration of a first defined time and of a second defined time is also intended to cover the circumstance in which there are several seconds or even minutes between the determination of an installation state and the determination of a system state.

The functional split, described above, into an installation diagnosis evaluation unit, a system diagnosis evaluation unit and a diagnosis report unit is not intended to have any guideline for the structural embodiment specifically implemented within a safety controller. It is thus possible to implement these three units separately in terms of structure, or to implement the installation diagnosis evaluation unit and the system diagnosis evaluation unit as a joint structural unit or even all three units may be implemented as one joint structural unit.

In a preferred refinement, the diagnosis report unit is designed to determine a number of association variables, wherein the association variables indicate which of the number of determined system states is respectively associated with which of the number of determined installation states, wherein the diagnosis report unit is designed to establish the number of associated system states on the basis of the number of association variables.

This measure is a simple procedure for associating a system state with an installation state. Hence, the number of determined system states which cause a determined installation state is associated with this installation state.

In a preferred refinement, the diagnosis report unit has an association memory unit which stores a plurality of association variables at least for a plurality of the installation states and at least for a plurality of the system states, wherein the stored association variables indicate which of the plurality of system states is respectively associated with which of the plurality of installation states on the basis of a predefined association, wherein the diagnosis report unit is designed to select a number of stored association variables for a number of pairings between the number of determined system states and the number of determined installation states, wherein each of these selected association variables represents at least one of the pairings, wherein the diagnosis report unit is designed to establish the number of associated system states on the basis of the number of association variables.

This measure provides a simple and also very reliable way of establishing the number of associated system states. As a result of the association memory unit permanently storing the predefined associations which respectively exist between the plurality of system states and the plurality of installation states, it is possible to explicitly determine which of the determined system states is respectively associated with which of the determined installation states. This ensures that the operating personnel on a system has complete and reliable instruction.

Preferably, these association variables are in the form of logic variables which indicate for which of the combinations conceivable between the plurality of system states and the plurality of installation states a respective association exists. A plurality of embodiments are conceivable for the association variables. Thus, by way of example, a matrix may be involved in which a logic one has been entered into a matrix array when a predefined association exists between the installation state associated with the matrix array for the logic one and the system state associated with this matrix array, and in which a logic zero has been entered into a matrix array when no predefined association exists between the installation state associated with this matrix array and the system state associated with this matrix array. Alternatively, the association variables may be a plurality of vectors. In this case, each of these vectors represents one of the plurality of installation states and indicates those system states which are associated with this installation state by means of predefined associations. In a further alternative, the process variables may be a plurality of tuples. Each of these tuples represents a combination of one of the plurality of system states and one of the plurality of installation states between which there is a predefined association.

In a preferred refinement, the diagnosis report unit is designed so that, when a determined installation state and a number of associated system states are present, it provides a number of system diagnosis reports as a diagnosis report for this installation state, wherein the number of the system diagnosis reports represent the number of associated system states.

As already stated, an installation state, i.e. a logical error, has a system state, i.e. a physical error, as its cause. The effect achieved by this measure is that, for a determined installation state, it is not the installation diagnosis report representing it but rather immediately the system diagnosis reports representing the number of associated system states that are displayed on the display unit. Hence, the operating personnel on an installation is immediately provided with a display of what physical errors are present. The operating personnel can therefore immediately start rectifying the fault. This measure therefore allows faults to be rectified in optimum times.

In a preferred refinement, the diagnosis report unit is designed so that, when a determined installation state and a number of associated system states are present, it provides a combination diagnosis report as a diagnosis report for this installation state, wherein the combination diagnosis report comprises both an installation diagnosis report and a number of system diagnosis reports, wherein the installation diagnosis report represents the determined installation state and the number of system diagnosis report represents the number of associated system states.

This measure has the advantage that the operating personnel on an installation is instructed comprehensively both about a determined installation state and about those determined system states which are associated with this installation state. Hence, the operating personnel are instructed about a logical error which is present and about the physical errors causing this logical error. Not only is comprehensive instruction of the operating personnel ensured, immediate rectification of a fault state is also possible on the basis of the comprehensive instruction.

In a further refinements of the aforementioned measure, the display unit may be designed to first display the installation diagnosis report and, when a system diagnosis request is present, to replace the installation diagnosis report with at least one of the number of system diagnosis reports or, as a supplement to the installation diagnosis report, to display at least one of the number of system diagnosis reports; or to display the installation diagnosis report and at least one of the number of system diagnosis reports simultaneously; or to display only at least one of the number of system diagnosis reports.

If the diagnosis report provided is a combination diagnosis report, various procedures concerning the display of the information comprised in the combination diagnosis report are conceivable, in principle.

Both the first alternative, in which first of all the installation diagnosis report and, when a system diagnosis request is present, at least one of the system diagnosis reports is displayed as an alternative or in addition, and the second alternative, in which the installation diagnosis report and at least one of the system diagnosis reports are displayed simultaneously from the outset, have the advantage of comprehensively instructing the operating personnel. In comparison with the second alternative, the first alternative has the advantage that the presentation on the display unit is initially clearer and, if needed, for example when the display unit is being read by a person who has appropriate access authorization allowing action in the system to rectify a fault, one or more of the physical errors and hence of the faults which are present in the system can be displayed. The third alternative, on the basis of which merely at least one of the system diagnosis reports is displayed from the outset, allows the operating personnel on the installation to immediately start rectification of the fault. In addition, it has the advantage of clear presentation.

In a preferred refinement, the diagnosis report unit is designed so that, when a determined installation state and a number of associated system states are present, it first of all provides an installation diagnosis report as a first diagnosis report and, when a system diagnosis request is present, it additionally provides a number of system diagnosis reports as a second diagnosis report, wherein the installation diagnosis report represents the determined installation state and the number of system diagnosis reports represent the number of associated system states.

This measure involves the provision of the diagnosis reports in two steps. In a first step, only the installation diagnosis report is provided. When a system diagnosis request is present, a number of system diagnosis reports are provided in a second step. This ensures that computer capacity is not unnecessarily occupied by the provision of diagnosis reports. On the basis of this approach, computer capacity needs to be mustered for the provision of the system diagnosis reports only when there is a system diagnosis request present.

In a further refinement of the aforementioned measure, the display unit is designed to replace the installation diagnosis report with at least one of the number of system diagnosis reports or to display at least one of the number of system diagnosis reports as a supplement to the installation diagnosis report.

This measure allows comprehensive and also clear instruction of the operating personnel on an installation.

In a further refinement of the aforementioned measure, the display unit has an associated system diagnosis request unit, wherein the system diagnosis request unit is designed to detect a system diagnosis request.

This measure allows a person reading the display unit to easily send out a system diagnosis request so as to have system diagnosis reports displayed when needed. Advantageously, the display unit and the system diagnosis request unit form a physical unit.

In a preferred refinement, the installation diagnosis evaluation unit is designed to repeatedly determine which of a plurality of installation states is respectively present at a defined time, and/or the system diagnosis evaluation unit is designed to repeatedly determine which of a plurality of system states is respectively present at a defined time.

This measure ensures that diagnosis reports are created not only within a short interval of time but over a relatively long period of time, for example throughout the operation of the installation. This ensures that the operating personnel on the installation is comprehensively instructed—also in respect of time—about faults which occur. The defined times at which it is determined which of a plurality of installation states is present in each case are determined by the first defined time and, by way of example, the clock rate at which the safety controller operates. A similar situation applies to the system states, but based on the second defined time.

In a further refinement of the aforementioned measure, the diagnosis report unit has a state memory unit which is designed to repeatedly store determined installation states and determined system states, wherein the diagnosis report unit is designed to use determined system states already stored and/or determined installation states already stored when establishing whether the system state to be stored is an associated system state and/or when establishing whether associated system states are present for an installation state that is to be stored.

This measure allows to combine installation states and system states which have been determined at different instances of time considerably spaced apart from one another, i.e. allows those system states which are associated with an installation state to be established and appropriate diagnosis reports to be provided. The reason is that the following situation is conceivable: a system state and hence a physical error are actually determined at an earlier time, for example because a sensor is faulty. At this time, however, no installation state, i.e. no logical error, has been determined to date because at this time a routine which is comprised in the user program, for example, and in which the signal provided by the sensor is processed has not yet even been called. In this case, the installation state and the system state can be combined. Overall, this measure allows comprehensive instruction of the operating personnel on an installation.

Advantageously, determined system states already stored and/or determined installation states already stored are used in the process of determining an association variable for a system state to be stored and/or for an installation state to be stored. On the one hand, those association variables are selected which represent those predefined associations which indicate with which installation states the system state to be stored is associated, and, on the other hand, those association variables are selected which represent those predefined associations which indicate which system states are associated with the installation state to be stored. This advantageously takes into account which of the association variables have already been selected at an earlier time. This avoids diagnosis reports being displayed again.

Advantageously, in addition to the determined installation states, those installation diagnosis reports which represent these installation states are also stored. Similarly, those system diagnosis reports which represent these system states are also stored for the determined system states.

The continual storage of the determined installation states and of the determined system states in the state memory unit has further advantages. It is thus possible to provide a report about the current status of the system to be controlled and/or the safety controller. In this case, not only the currently determined installation states and the currently determined system states, but also already determined installation states and already determined system states which are stored in the state memory unit can be considered. In addition, it is possible to provide a report which represents a change in the status. Furthermore, evaluation and hence diagnosis can be performed regarding what diagnosis reports are currently pending. Moreover, an event report can be created which comprises details regarding the time at which a diagnosis report appeared, i.e. was provided, and the time at which a diagnosis report disappeared again, i.e. that fault which is represented by the diagnosis report was rectified.

In a preferred refinement, the control unit has an input/output unit having a plurality of inputs and having a plurality of outputs, wherein the input/output unit is designed to use a number of the plurality of inputs to respectively receive at least one of the plurality of control input signals and to use a number of the plurality of outputs to respectively output at least one of the plurality of control output signals, wherein the user program comprises a plurality of program variables, wherein the plurality of program variables comprise a plurality of input variables and a plurality of output variables, wherein, pursuant to an association rule defined during the creation of the user program, firstly the input variables are respectively associated with one of the inputs and with a control input signal received via this input and secondly the output variables are respectively associated with one of the outputs and with a control output signal output via this output, wherein the stored association variables have been created on the basis of the association rule.

This measure makes it possible to determine the stored association variables, to be more precise the predefined associations, easily and without great complexity. In any case, a substep in the creation of a user program is association of the input variables with the control input signals and hence with the input terminals of the safety controller and association of the output variables with the control output signals and hence with the output terminals of the safety controller, because the installation cannot be controlled by the user program without these associations. This association is usually referred to as I/O mapping. This association reveals the combination between firstly the process which is represented by the input variables and the output variables and secondly the system which is represented by the control input signals and the control output signals or the input terminals and the output terminals of the safety controller. This association can therefore be used as a basis for combining the installation states and the system states, to be more precise the association of system states with installation states. The order, i.e. whether a variable is associated with the signal and hence with a terminal or whether a variable is associated with a terminal and hence with a signal, is irrelevant in this case. It is merely important that these three details are brought together.

The example below is intended to illustrate the mode of action. By way of example, if there is an error on an input terminal, termed here as a physical error, a corresponding system state is determined then. On the basis of the error on the input terminal, the associated input variable is also erroneous. If this input variable is now used for looking at threshold values, which is the basis for determining an installation state, then the erroneous input variable is taken as a basis for recognizing a logical error and hence determining an installation state. On the basis of the association information used for the I/O mapping, it is now certain that the determined system state is associated with the determined installation state.

In a preferred refinement, the user program is created by providing a plurality of software components, wherein the plurality of the software components correspond to the plurality of installation hardware components, wherein at least a number of the software components respectively have an associated number of the plurality of installation states and an associated number of installation diagnosis reports, wherein the number of installation diagnosis reports represent the number of the plurality of installation states.

This measure makes it a simple matter to write a user program. The association of installation states and of installation diagnosis reports representing the installation states with individual software components has a plurality of advantages. The use of software components having associated installation states and installation diagnosis reports representing said installation states ensures unity within a user program in the form that software components which are identical to one another in terms of installation diagnosis are provided for identical installation hardware components comprised in the installation to be controlled, given appropriate selection. This ultimately also contributes to an increase in failsafety.

In a preferred refinement, the user program has a hierarchically structured design with a plurality of hierarchical levels, wherein during the creation of the user program an installation structure variable is established which represents the hierarchically structured design of the user program, wherein the diagnosis report unit is designed to provide the number of diagnosis reports on the basis of the installation structure size.

Individual hierarchical levels each contain an associated number of software components, wherein each of these software components corresponds to an installation hardware component. If the installation hardware component is a simple component, the relevant software component in this case is in the form of an elementary component, which itself does not contain any further software components. If, by contrast, the installation hardware component is a complex component then the relevant software component is in the form of a group component, and itself in turn comprises software components. The group components result in the hierarchically structured design of the user program, which in turn is based on the design of the installation to be controlled.

The provision of the number of diagnosis reports on the basis of the installation structure variable has the following advantage: a determined installation state is explicitly associated with a software component. Consequently, a diagnosis report can be provided for the determined installation state and is stored in the software component with which it is associated. On the basis of the installation structure size, in turn, it is known which software component on the next highest hierarchical level or an even higher hierarchical level has the associated software component on a structure-related basis, with which the determined installation state is more easily associated. This structure-related association can now be used to provide a diagnosis report—instead of the diagnosis report which is stored in the software component with which the determined installation state is associated—which is stored in a software component which is situated on the next highest or an even higher hierarchical level and which has the associated software component on a structure-related basis with which the determined installation state is associated. By way of example, this approach allows to provide what is termed here as a collective diagnosis report. The provision of a collective diagnosis report is advantageous in the following situation: a plurality of installation states are determined. These installation states are associated not only with one software component but rather with a plurality of software components. These software components, in the hierarchical structure of the user program, open into a software component which is included on a higher hierarchy level. Instead of now providing a diagnosis report for each determined installation state, it is possible to provide a diagnosis report which is comprised in the software component into which the other software components open. Overall, this increases the clarity when displaying diagnosis reports.

The applicant reserves the right to pursue the approach on which the measure described above is based in a separate application too.

In a further refinement, the installation diagnosis evaluation unit has an installation diagnosis memory unit, wherein the installation diagnosis memory unit stores the plurality of installation states and also a number of installation diagnosis reports, wherein the installation diagnosis reports each represent one of the plurality of installation states, wherein the plurality of installation states and/or the installation diagnosis reports are created when the user program is created. In addition, the installation diagnosis memory unit stores the installation structure size.

On the basis of this measure, all details required for comprehensive installation diagnosis are stored coherently at a central location. This allows rapid determination of installation states. In addition, possible sources of error can be ruled out, which may arise when the aforementioned details are stored at multiple locations.

In a preferred refinement, the system diagnosis evaluation unit has a system diagnosis memory unit, wherein the system diagnosis memory unit stores the plurality of system states and also a number of system diagnosis reports, wherein the system diagnosis reports each represent one of the plurality of system states.

This measure has the advantage that all details that are required for comprehensive system diagnosis are stored centrally. Rapid determination of system states is therefore also possible in this case. Possible sources of error are also ruled out, which may arise when the aforementioned details are stored at multiple memory locations.

Advantageously, the plurality of system states and the number of system diagnosis reports are defined by the manufacturer of the safety controller. This measure helps to increase failsafety. Furthermore, it is advantageous if both the plurality of system states and the number of system diagnosis reports are stored unalterably in the system diagnosis memory unit, and can therefore be changed neither by the operator of the installation nor by the writer of the user program running in the safety controller. This measure also helps to increase failsafety.

In a preferred refinement, the safety controller comprises a plurality of control hardware components, wherein at least a number of the control hardware components are respectively associated with a number of the plurality of system states and number of system diagnosis reports, wherein the number of system diagnosis reports represent the number of the plurality of system states.

This measure ensures that a control hardware component is associated with relevant system states and system diagnosis reports corresponding to said system states. Taking into account the defined association rule, explicit association of a system state with an installation state is therefore possible.

In a preferred refinement, the safety controller has a hierarchically structured design, wherein the system diagnosis memory unit stores a control structure variable which represents the hierarchically structured design of the safety controller, wherein the diagnosis report unit is designed to provide the number of diagnosis reports on the basis of the control structure variable.

This measure also allows the provision of collective diagnosis reports—already described further above in connection with the installation diagnosis—for the system diagnosis. Therefore, the advantages demonstrated in connection with the installation diagnosis apply accordingly in this case.

The applicant reserves the right to pursue the approach on which the measure described above is based in a separate application too.

In a further refinement, the user program has at least one safety control module, in which safety-related control input signals are processed in failsafe fashion, and at least one standard control module, in which predominantly process-related control input signals are processed.

In this refinement, the plurality of sensors advantageously comprise a number of first sensors which are designed to detect safety-related variables, wherein these safety-related variables are supplied to the safety control module by means of safety-related control input signals, and a number of second sensors which are designed to detect process-related variables, wherein these process-related variables are supplied to the standard control module by means of process-related control input signals. Furthermore, this refinement advantageously has provision for the plurality of control output signals to comprise a number of first control output signals, which are determined in the safety control module and which are intended for actuating a number of first actuators which are designed to perform safety-related actions, and to comprise a number of second control output signals, which are determined in the standard control module and which are intended for actuating a number of second actuators which are designed to perform process-related actions. This design of the user program, according to which the user program comprises at least one safety control module and at least one standard control module, allows one and the same user program to be able to be used to handle both control tasks which are associated with the safety control aspect and control tasks which are associated with the standard control aspect. Hence, a safety controller designed in accordance with this aspect can be used to implement both control tasks which are associated with the safety control aspect and control tasks which are associated with the standard control aspect. This has the advantage that, for comprehensive control of an installation, i.e. for control which covers both the safety control aspect and the standard control aspect, only one controller is required rather than two controllers, one of which handles the control tasks which are associated with the safety control aspect and one of which handles the control tasks which are associated with the standard control aspect. This also reduces the complexity required for wiring. Overall, this measure is an cost-effective way of implementing comprehensive control for an installation. At this occasion, it should be pointed out that the wording that predominantly process-related control input signals are processed in the standard control module means that it is also possible for safety-related control input signals to be processed in the standard control module.

Advantageously, the display unit is a display unit integrated in the control console of the installation to be controlled. Alternatively, it may be a further display unit which is provided in the installation to be controlled in addition to the display unit integrated in the control console. By way of example, the display unit may be in the form of an LCD screen, in the form of a cathode-ray-based screen or in the form of an alphanumeric text area.

For the sake of completeness, the following should be noted at this occasion: if an installation state has been determined and if no system states associated with this installation state have been determined then the diagnosis report provided is that installation diagnosis report which represents the determined installation state.

It goes without saying that the features mentioned above and the features which are yet to be explained below can be used not only in the respectively indicated combination but also in other combinations or on their own without departing from the scope of the present invention.

BRIEF DESCRIPTION OF THE DRAWINGS

Exemplary embodiments are illustrated in the drawing and are explained in more detail in the description below, in which.

DESCRIPTION OF PREFERRED EMBODIMENTS

Figure 1:
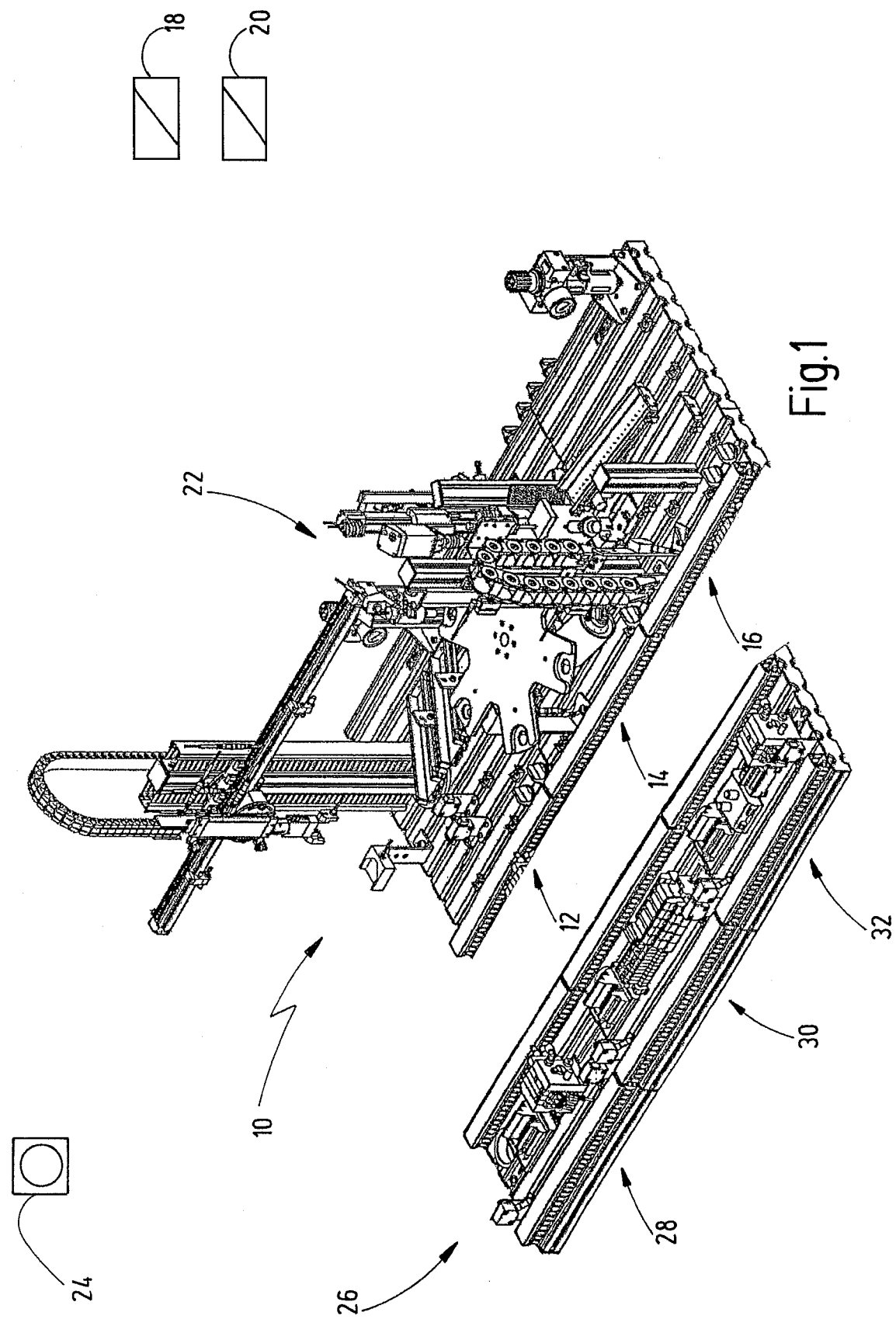
FIG. 1 shows a schematic illustration of an installation to be controlled.

In FIG. 1, an installation to be controlled is denoted as a whole by the reference numeral 10. The installation 10 comprises three components, namely a handling station 12, a process station 14 and a test station 16, and two contactors 18, 20. The handling station 12 is used to fill the process station 14 with workpieces. These workpieces are machined in the process station 14. Next, the machined workpieces are forwarded by the handling station 12 to the test station 16, in which a check is performed to determine whether the machined workpiece satisfies appropriate examination criteria. If these examinations are passed, the process station 14 can again be filled with a new workpiece for machining. The two contactors 18, 20 connect the loads 22 in the system 10 to a power supply—not shown. The system has an associated first emergency-off pushbutton 24 which can be used to disconnect the system 10 and in so doing transfer it to a safe state in the event of a hazard. To this end, the two contactors 18, 20 are actuated so that the loads 22 are isolated from the power supply. The system 10 is controlled by a safety controller 26, the safety controller 26 comprising a plurality of control hardware components 28, 30, 32. The individual control hardware components may be associated with individual component parts, but this does not necessarily have to be the case. In the present exemplary embodiment, the control hardware component 28 is meant to be associated with the component part 12, the control hardware component 30 is meant to be associated with the component part 14 and the control hardware component 32 is meant to be associated with the component part 16. Since this is a schematic illustration, no wiring has been considered.

Figure 2:
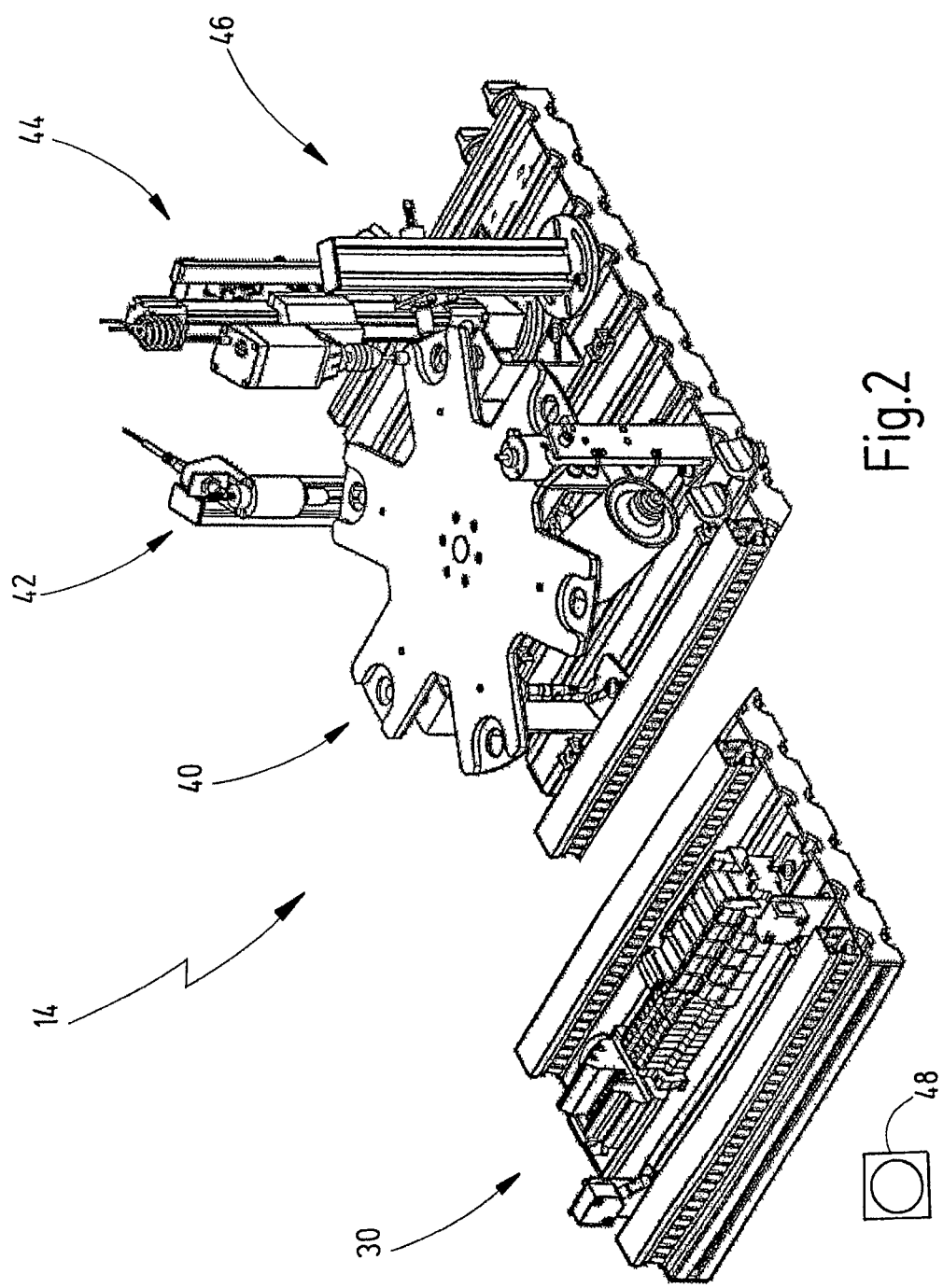
FIG. 2 shows a schematic illustration of a component part of the installation to be controlled.

In FIG. 2, the process station component part is denoted as a whole by the reference numeral 14. The fact that subsequently only the process station and the hardware components comprised therein are considered is not intended to have any limiting effect. The comments below also apply in corresponding fashion to the handling station 12 and the test station 16.

The process station 14 comprises a rotary table 40, an examination module 42, a drilling module 44 and an ejection module 46. The rotary table 40 can be used to transport all workpieces in the process station 14 between the individual modules 42, 44, 436. The examination module 42 is used to check workpieces that are to be machined for the presence of prescribed properties. The drilling module 44 is used to machine the workpieces located in the process station 14. The ejection module 46 is used to remove the machined workpieces and to forward them to the test station 16. The process station 14 has an associated second emergency-off pushbutton switch 48 which can be used to disconnect the process station 14 and in so doing to transfer it to a safe state in the event of a hazard.

Figure 3:
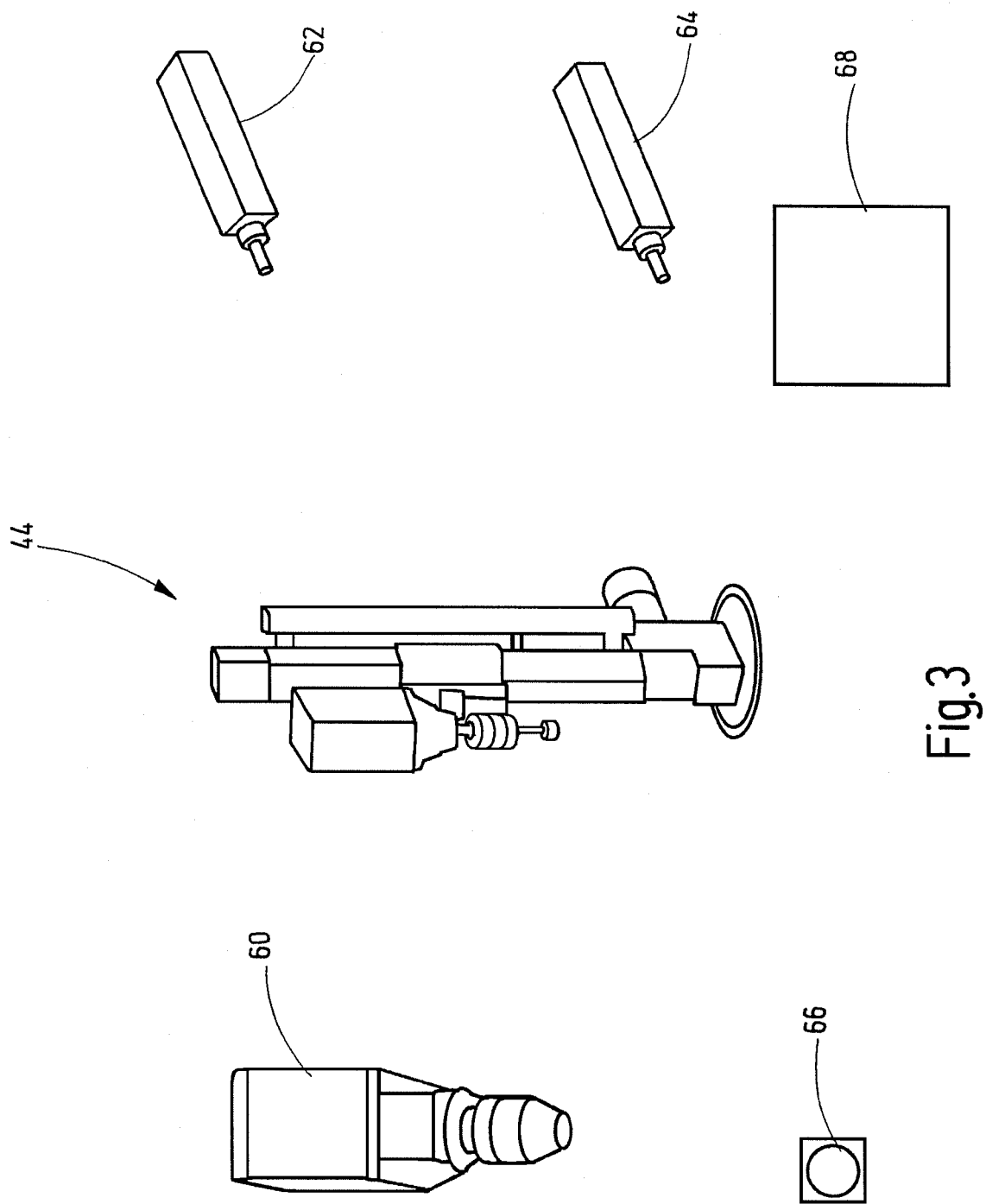
FIG. 3 shows a schematic illustration of a subcomponent that is comprised in the component part, and the individual components thereof.

In FIG. 3, the drilling module is denoted as a whole by the reference numeral 44.

As individual components with a mechanical or electrical or electromechanical function, the drilling module 44 has a motor 60, a transfer cylinder 62 and a drilling cylinder 64. The two cylinders 62, 64 can be used to move the motor 60 along a guidance unit relative to the workpiece that is to be machined, specifically with the drilling cylinder 64 in a vertical direction and with the transfer cylinder 62 in a horizontal direction. The drilling module 44 has an associated third emergency-off pushbutton switch 66 which can be used to disconnect the drilling module 44 and in so doing to transfer it to a safe state in the event of a hazard. The reference numeral 68 denotes those control hardware components which are comprised in the control hardware component 30 and which are associated with the drilling module 44.

As can be seen from the illustrations in FIGS. 1 to 3, the system 10 to be controlled comprises a plurality of installation hardware components, namely at least the component parts 12, 14, 16 shown in FIG. 1, the components rotary table 40, examination module 42, drilling module 44 and ejection module 46 shown in FIG. 2, and the components motor 60, transfer cylinder 62 and drilling cylinder 64 shown in FIG. 3. To these are added further components, namely those which are comprised in the handling station 12 and in the test station 16, which have not been discussed explicitly above, however.

Similarly, the illustrations in FIGS. 1 to 3 reveal that the safety controller comprises a plurality of control hardware components and overall has a hierarchically structured design.

Figure 4:
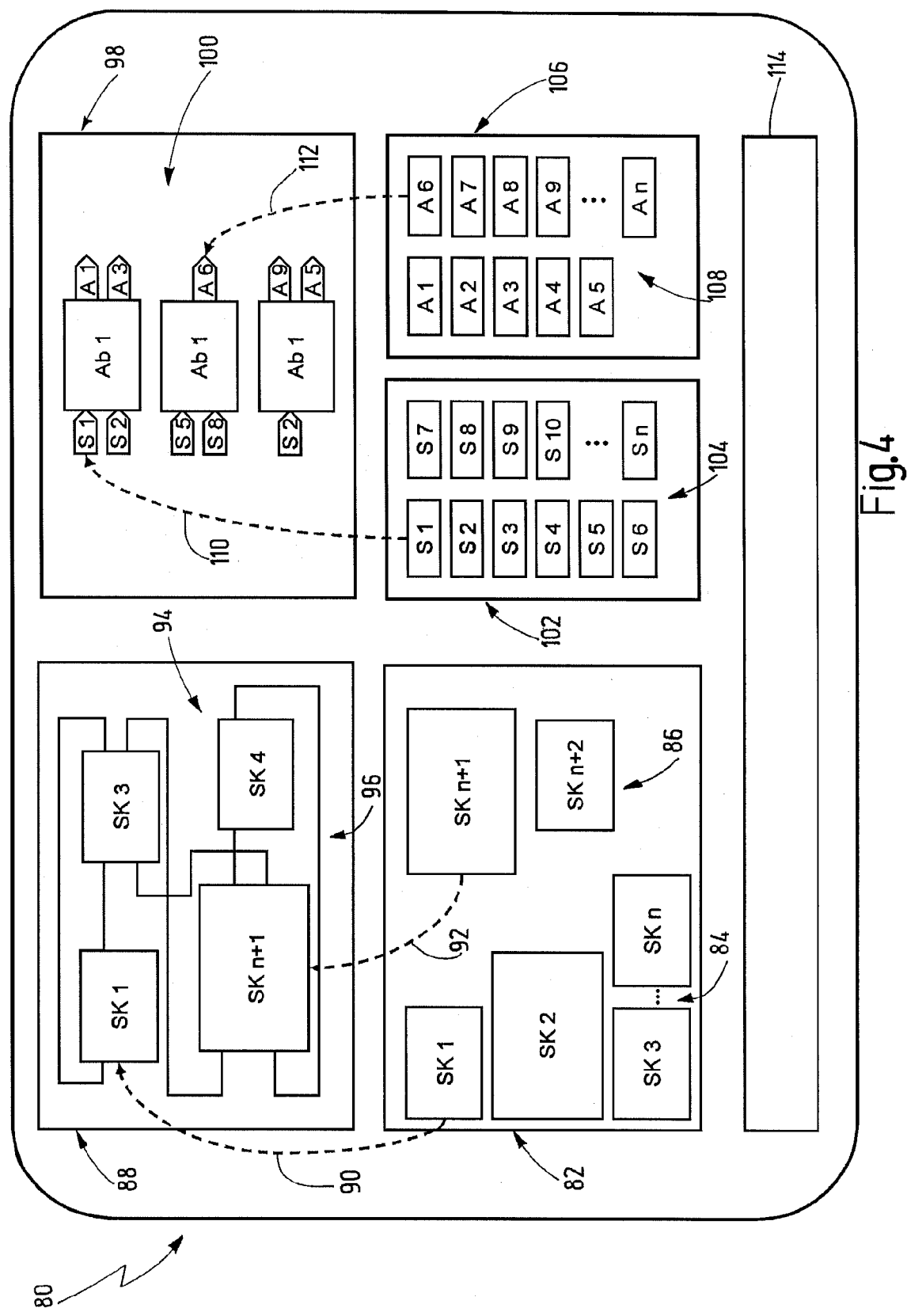
FIG. 4 shows a simplified illustration of a graphical interface for writing a user program.

In FIG. 4, a graphical interface is denoted as a whole by reference numeral 80. This graphical interface allows a programmer to write a user program.

The graphical user interface 80 comprises a software component area 82 which comprises a set 84 of predefined software components in the form of graphical symbols. The predefined software components have been created by the provider of the computer program which is used to carry out the method for writing a user program and are stored in a database included in said computer program. In addition, the software component area 82 comprises a set 86 of freshly written software components in the form of graphical symbols. The freshly written software components are such software components as the programmer writes when writing the user program for installation hardware components comprised in the system 10 to be controlled which have no corresponding predefined software component comprised in the aforementioned database. The database comprised in the computer program is extended by these software components.

Those software components which themselves do not contain any further software components are illustrated by means of a small block. These software components are referred to as elementary components. By contrast, those software components which themselves contain further software components are illustrated by means of a large block. These software components are referred to as group components.

The user program is written by providing a plurality of software components. For this purpose, the graphical user interface 80 comprises a component area 88. The software components to be provided are selected and are transferred to the component area 88, as indicated by means of two arrows 90, 92. The selection and transfer can be effected using what is known as a drag & drop function, for example.

The component area 88 accordingly comprises a plurality 94 of software components which have been provided. These are the software components on the topmost hierarchy level of the user program. The logic combination of the plurality 94 of software components is used to write a component program part. To this end, at least some of the logic inputs and at least some of the logic outputs of the software components are connected to one another, which is illustrated by a plurality 96 of connections. On the basis of the internal logic combinations which are respectively comprised in the software components, said comprised software components are automatically also combined if these software components contain elementary components and/or group components. As a result, it is sufficient for the writing of the component program part to involve the software components comprised on the topmost hierarchy level being logically combined with one another.

The user program is hierarchically structured. The provided plurality 94 of software components defines a topmost hierarchy level. If this plurality 94 of software components comprises a software component which is in the form of a group component, the number of software components which is comprised in said software component defines a further hierarchy level situated below the topmost hierarchy level.

Before the further areas comprised in the graphical interface 80 are discussed, the basic design of a software component will be presented first of all. This will be done by leaping ahead to FIG. 8, which is yet to be described.

Figure 8:
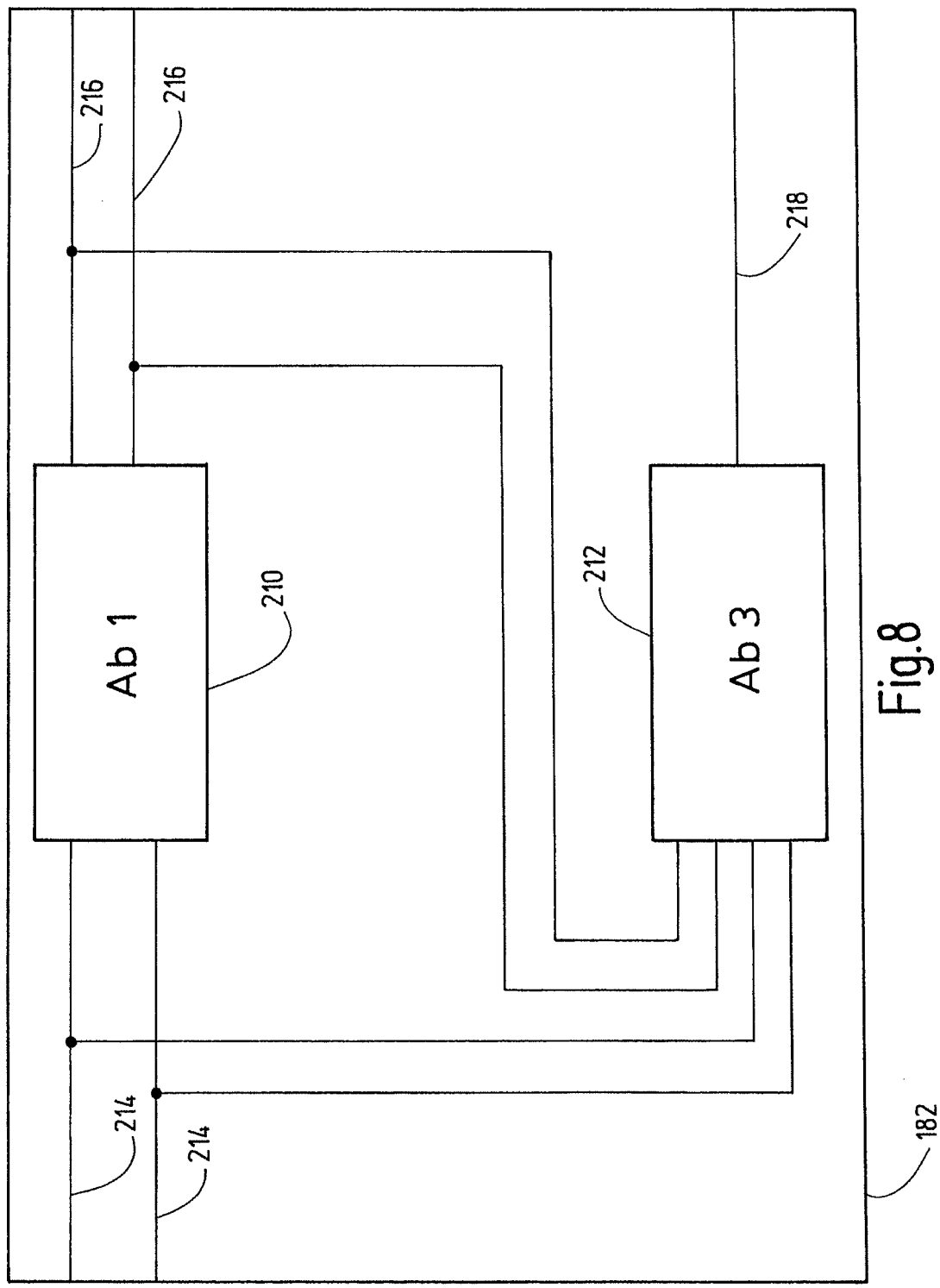
FIG. 8 shows a schematic illustration of the aspect blocks provided for an individual component comprised in the subcomponent.

FIG. 8 shows the basic design of a software component in the form of an elementary component. An elementary component has a plurality of aspect blocks. Each of these aspect blocks is associated with one of a plurality of control aspects which are different from one another, each of said control aspects representing a separate control aspect of the safety controller. In this case, the software component comprises all those aspect blocks which are of significance to that installation hardware component related to the software component. Hence, the installation hardware component is described fully with a view to the control aspects of the safety controller by the software component which represents it. In comparison with an elementary component, a group component comprises not only the aspect blocks but additionally software components which may be in the form of an elementary component or in the form of a group component.

Advantageously, the control aspects which are different from one another may be the following control aspects: standard control aspect which represents the standard control aspect part; safety control aspect which represents the safety control aspect part; diagnosis aspect which represents the diagnosis aspect part; visualization aspect which represents the visualization aspect part; drive regulation aspect which represents the drive regulation aspect part; cooling aspect which represents the cooling aspect part; access authorization aspect which represents the access authorization aspect part; servicing aspect which represents the servicing aspect part; locking aspect which represents the locking aspect part;

manual operation aspect which represents the manual operation aspect part; data management aspect which represents the data management aspect part.

For each aspect block comprised in a software component, at least those logic variables and/or those parameters and/or those sensor signals which are required for processing and can be supplied to the aspect block via associated inputs and those logic variables and/or those parameters and/or those output signals which are respectively determined in the number of aspect blocks and which are output from the aspect block via associated outputs are first of all defined on their merits. The specific sensors and/or actuators which can be connected to the respective aspect block are ultimately defined only when the user program is written.

In addition, at least some of the aspect blocks comprised in a software component each store a functional program which defines aspect properties of the hardware component for that control aspect with which the respective aspect block is associated.

The graphical interface 80 also comprises an aspect area 98. This aspect area 98 comprises a plurality 100 of aspect blocks. Each of these aspect blocks is associated with the same control aspect. In the exemplary embodiment, this is intended to be the standard control aspect part. The plurality 100 of aspect blocks comprise the aspect blocks which are comprised on all hierarchy levels of the user program and which are associated with the standard control aspect, specifically regardless of whether they are comprised on one of the hierarchy levels separately or as part of a software component. The aspect area also comprises the aspect blocks which are comprised on the topmost hierarchy level of the user program.

The graphical interface 80 also comprises a sensor area 102. This sensor area 102 comprises a plurality 104 of graphical sensor symbols. For each sensor which is comprised in the system 10 that is to be controlled, the sensor area 102 comprises an associated graphical sensor symbol. The plurality 104 of graphical sensor symbols represent both the sensors comprised for the safety control aspect and the sensors comprised for the standard control aspect in the system 10 that is to be controlled. As a further area, the graphical interface 80 comprises an actuator area 106. This actuator area 106 comprises a plurality 108 of graphical actuator symbols. For each actuator which the system 10 that is to be controlled contains, the actuator area 106 comprises an associated graphical actuator symbol. The plurality 108 of graphical actuator symbols comprise both the actuators comprised for the safety control aspect and the actuators comprised for the standard control aspect in the installation to be controlled.

For the plurality 100 of aspect blocks which is comprised in the aspect area 98, an aspect program part is written. To this end, at least for some of the aspect blocks comprised in the aspect area 98, both the inputs thereof and the outputs thereof have what is known as I/O mapping performed for them. That is to say that at least some of the signal inputs are assigned those sensor means whose sensor signals are processed in the respective aspect block. This is shown by way of example by an arrow 110. Furthermore, at least some of the signal outputs are assigned actuators which are actuated using the output signals determined in the respective aspect block. This is shown by way of example by an arrow 112. Alternatively, the I/O mapping can also be performed by means of text inputs in an input area 114.

The method described above for writing a user program involves all program variables being comprised in the aspect blocks. Consequently, the signal inputs of the aspect blocks have associated input variables comprised in the user program, and the signal outputs of the aspect blocks have associated output variables comprised in the user program. The association between the sensors and the signal inputs therefore defines the association between sensors and input variables, to be more precise between control input signals and input variables. Since it is known which sensor is connected to which input of an input/output unit comprised in the safety controller, the association between inputs, control input signals and input variables is therefore defined overall. The association between the actuators and the signal outputs also defines the association between actuators and output variables, to be more precise between control output variables and output variables. Since it is known which actuator is connected to which output of the input/output unit, the association between outputs, control output variables and output variables is therefore defined.

Once the aspect program parts have been written for all the control aspects, the association rule is defined completely and the association variables to be stored can be created.

Overall, one aspect program part is written for each control aspect. Once all the aspect program parts have been written, the component program part and the aspect program parts are combined to form the user program.

Figure 5:
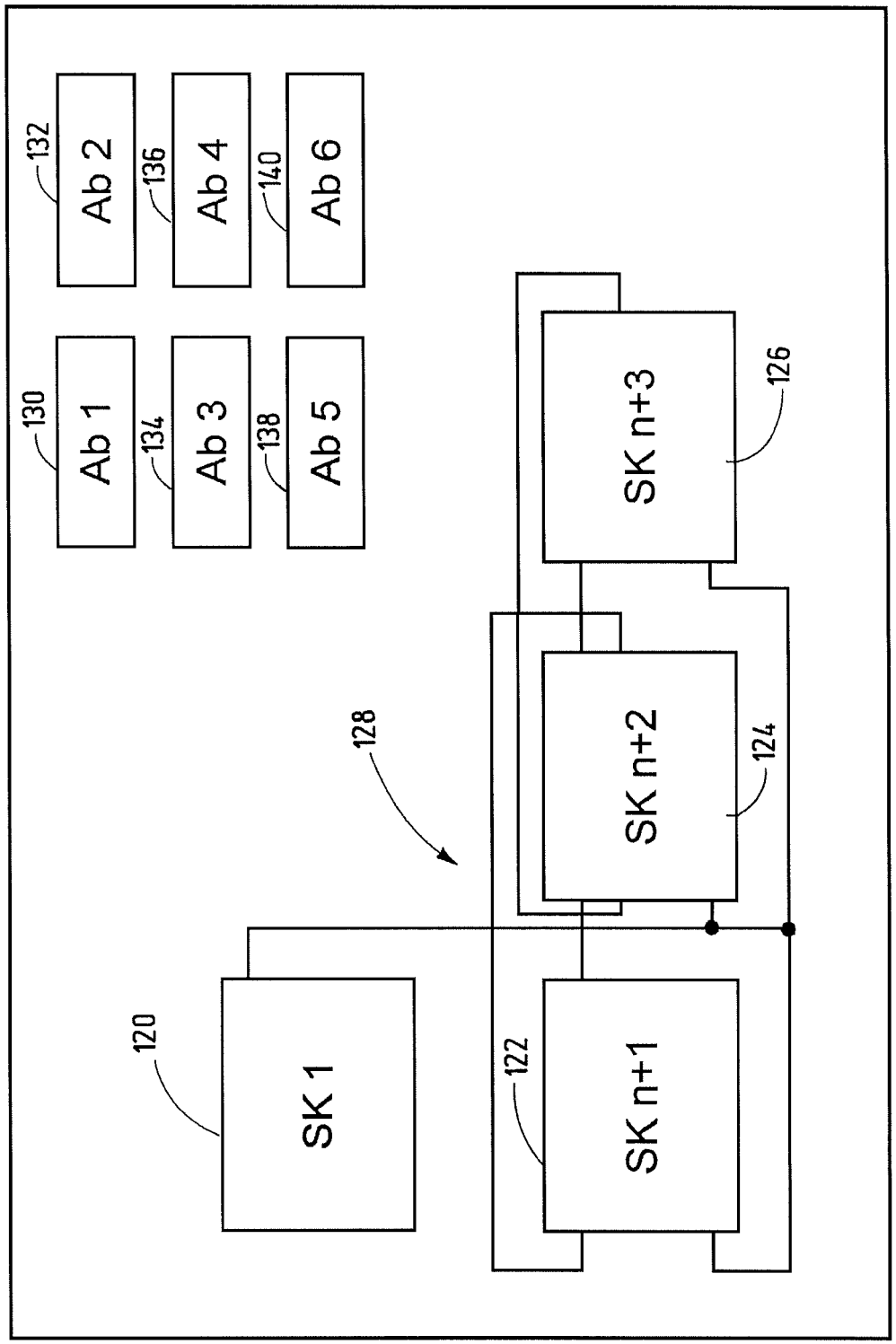
FIG. 5 shows a schematic illustration of the software components and aspect blocks provided for the installation to be controlled on a topmost hierarchy level for the user program.

FIG. 5 shows those software components and aspect blocks for the system 10 to be controlled which are comprised on the topmost hierarchy level.

Specifically, these are the following software components: a first software component 120, which corresponds to the first emergency-off pushbutton switch 24 and is in the form of an individual component, a second software component 122, which corresponds to the handling station 12, a third software component 124, which corresponds to the process station 14, a fourth software component 126, which corresponds to the test station 16, wherein the software components 122, 124, 126 are each in the form of a group component. Each of the software components 122, 124, 126 represents a real mechatronic installation hardware component which is present in the system 10 that is to be controlled. The software components are connected to one another by means of a first plurality 128 of logical connections in order to implement flow control.

In addition, the following aspect blocks are involved: a first aspect block 130 which is associated with a standard control aspect, a second aspect block 132 which is associated with a safety control aspect, a third aspect block 134 which is associated with a diagnosis aspect, a fourth aspect block 136 which is associated with a visualization aspect, a fifth aspect block 138 which is associated with a drive regulation aspect, and a sixth aspect block 140 which is associated with a locking aspect.

Each of these aspect blocks stores a functional program which is designed to handle those control tasks which are part of the control aspect with which the respective aspect block is associated. The third aspect block 134 stores those examination conditions and installation diagnosis reports which are required for performing installation diagnosis for the system 10 that is to be controlled as such. The system 10 that is to be controlled as such is defined by the cluster comprising the handling station 12, the process station 14 and the test station 16 and therefore by the cluster of the software components 122, 124, 126 on the topmost hierarchy level of the user program. Logical connections between individual aspect blocks themselves and to a software component have not been shown for reasons of clarity.

Figure 6:
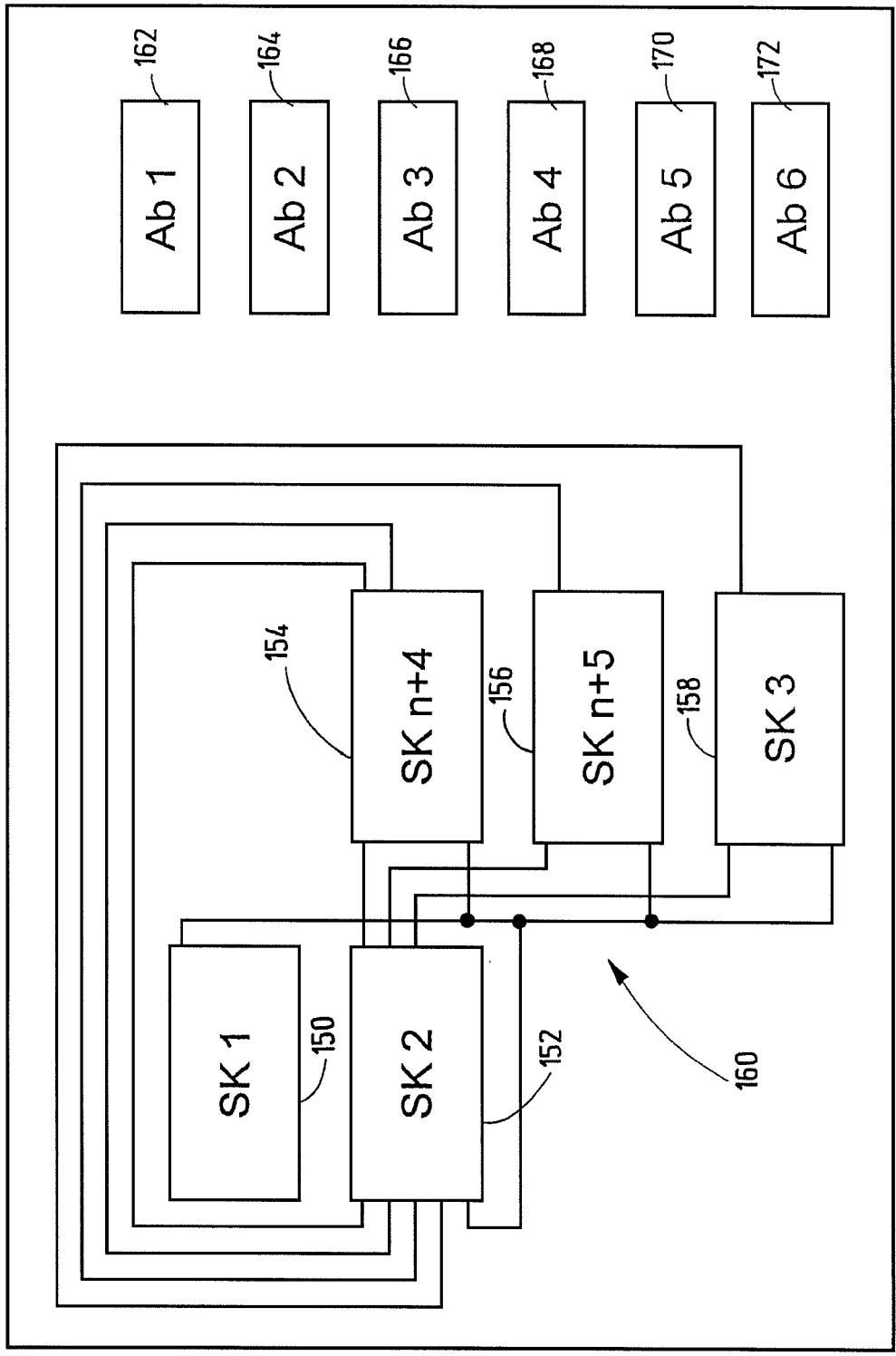
FIG. 6 shows a schematic illustration of the software components and aspect blocks provided for the component part.

FIG. 6 shows the software components and aspect blocks comprised in the third software component 124.

The reference numeral 150 denotes a fifth software component which corresponds to the second emergency-off pushbutton switch 48 and which is in the form of an elementary component. The reference numeral 152 denotes a sixth software component which corresponds to the rotary table 40. The reference numeral 154 denotes a seventh software component which corresponds to the examination module 42. The reference numeral 156 denotes a eighth software component which corresponds to the drilling module 44. The reference numeral 158 denotes a ninth software component which corresponds to the ejection module 46. The software components 152, 154, 156, 158 are in the form of group components. The software components are connected to one another by means of a second plurality 160 of logical connections in order to implement a flow control. The software components 152, 154, 156, 158 also each represent a real mechatronic installation hardware component which is present in the system 10 that is to be controlled.

In addition, the third software component 124 has a plurality of aspect blocks: a seventh aspect block 162 which is associated with the standard control aspect, an eighth aspect block 164 which is associated with the safety control aspect, a new aspect block 166 which is associated with the diagnosis aspect, a tenth aspect block 168 which is associated with the visualization aspect, an eleventh aspect block 170 which is associated with the drive regulation aspect, and a twelfth aspect block 172 which is associated with the locking aspect. These aspect blocks also each store a functional program. The ninth aspect block 166 stores those examination conditions and installation diagnosis reports which are necessary for performing installation diagnosis for the process station 14 as such. Logical connections between individual aspect blocks themselves and to a software component have not been shown for reasons of clarity.

Figure 7:
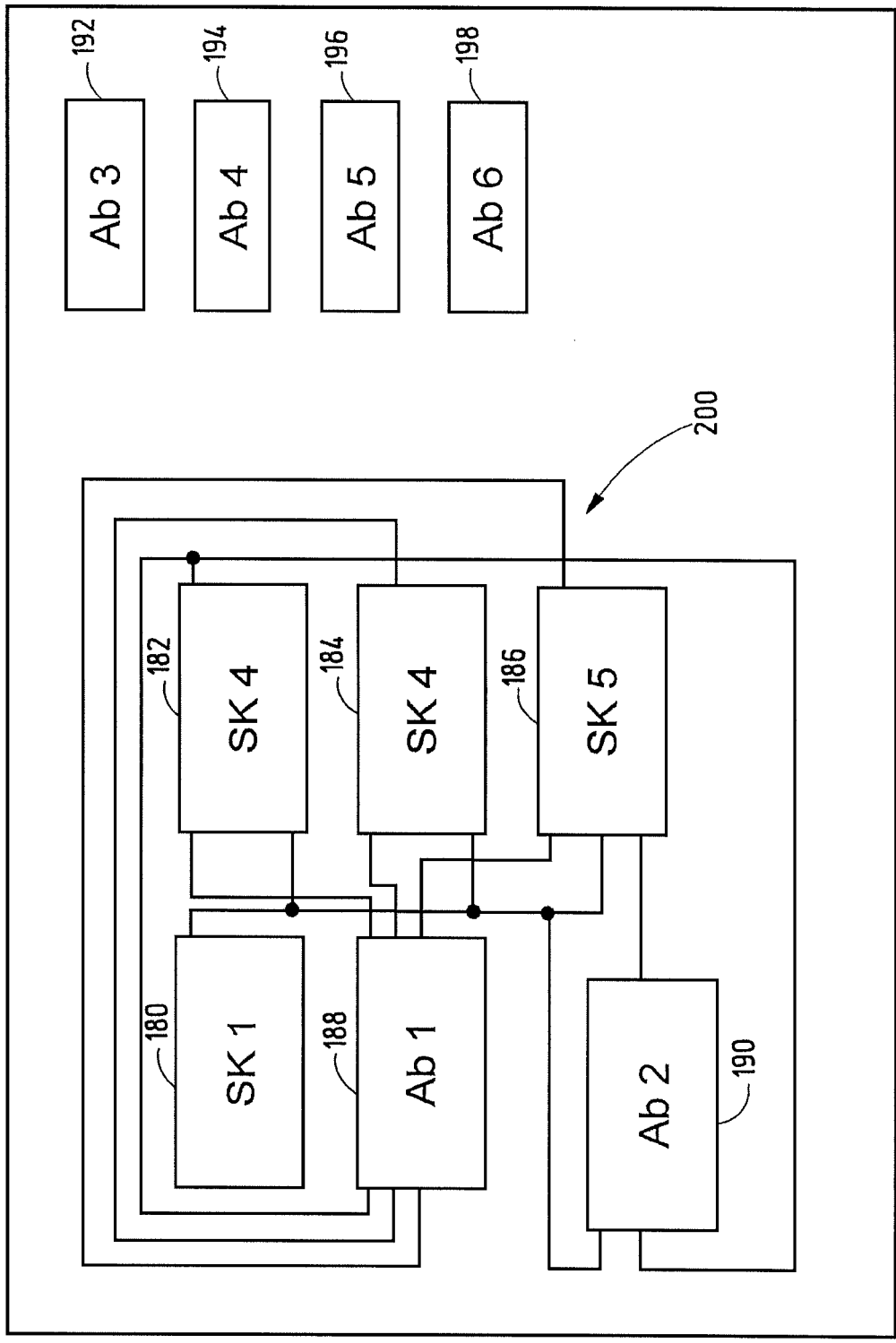
FIG. 7 shows a schematic illustration of the software components and aspect blocks provided for the subcomponent.

FIG. 7 shows the software components and aspect blocks which are comprised in the eighth software component 156. These are a tenth software component 180 which corresponds to the third emergency-off pushbutton switch 66, an eleventh software component 182 which corresponds to the drilling cylinder 64, a twelfth software component 184 which corresponds to the transfer cylinder 62, and a thirteenth software component 186 which corresponds to the motor 60. These software components are in the form of elementary components.

In addition, the eighth software component 156 comprises a thirteenth aspect block 188 which is associated with the standard control aspect, a fourteenth aspect block 190 which is associated with the safety control aspect, a fifteenth aspect block 192 which is associated with the diagnosis aspect, a sixteenth aspect block 194 which is associated with the visualization aspect, a seventeenth aspect block 196 which is associated with the drive regulation aspect, and a eighteenth aspect block 198 which is associated with the locking aspect. The fifteenth aspect block 192 stores those examination conditions and installation diagnosis reports which are necessary for performing installation diagnosis for the drilling module 44 as such.

The software components and some of the aspect blocks are connected to one another by means of a plurality of logical connections for the purpose of implementing flow control. The logical connections have not been shown completely for reasons of clarity.

FIG. 8 shows those aspect blocks which are comprised in a software component which corresponds to a cylinder which the system 10 that is to be controlled contains. In the present exemplary embodiment, this is the eleventh software component 182, for example. This is not intended to have any limiting effect, however, and the comments below likewise apply to the twelfth software component 184.

The eleventh software component 182 comprises a nineteenth aspect block 210, which is associated with the standard control aspect, and a twentieth aspect block 212, which is associated with the diagnosis aspect. Since the mode of operation of an aspect block associated with the diagnosis aspect is meant to be explained with reference to the standard control aspect, no further aspect blocks are shown in FIG. 8.

The fourth logical connections 214 are used to supply the nineteenth aspect block 210 with signals which are produced by two end position sensors, and which each indicate that the drilling cylinder 64 is occupying one of the two possible end positions. These two signals are likewise supplied to the twentieth aspect block 2121 via the fourth logical connections 214. In the nineteenth aspect block 210, control output signals are produced in accordance with the functional program stored in said aspect block, said control output signals being used to actuate the drilling cylinder 64. These control output signals are supplied to the twentieth aspect block 212 via fifth logical connections 216. The twentieth aspect block 212 performs installation diagnosis on the basis of the signals supplied to it. This installation diagnosis can be used to determine the following installation states: "The cylinder is not retracted"; "The cylinder is not extended"; "Both limit switches have been operated". The installation diagnosis report which represents the determined installation state is output via a sixth logical connection 218.

Figure 9:
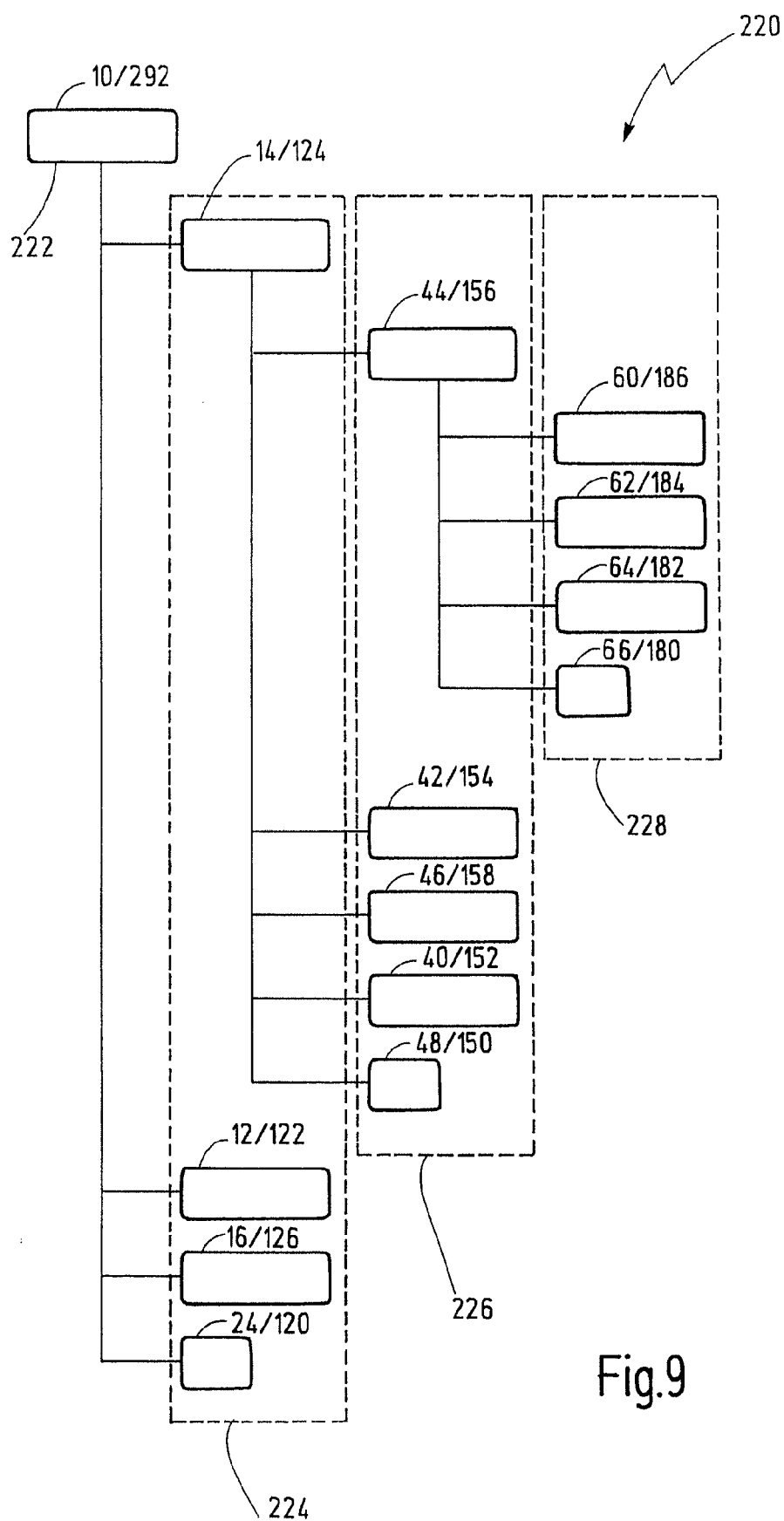
FIG. 9 shows an overview illustration of the hierarchic structure of a written user program.

In FIG. 9, a first hierarchic structure is denoted as a whole by the reference numeral 220.

This first hierarchic structure represents both that hierarchic structure on which the system 10 that is to be controlled is based and that hierarchic structure on which the user program for the safety controller is based. In the illustration chosen for FIG. 9, each block has two meanings. The reference numeral which precedes the oblique stroke indicates which installation hardware component of the system 10 that is to be controlled is represented by the respective block. The reference numeral which follows the oblique stroke indicates which software component is represented by the respective block in the user program.

The reference numeral 222 denotes a block which represents the system 10 that is to be controlled as a whole or the user program as a whole. The reference numeral 224 denotes a topmost system hierarchy level, the installation hardware components of which are referred to as component parts. The reference numeral 226 denotes a first system hierarchy level which is situated directly below the topmost system hierarchy level and the installation hardware components of which are referred to as subcomponents. The reference numeral 228 denotes a second system hierarchy level which is situated directly below the first system hierarchy level and the installation hardware components of which are referred to as individual components. In FIG. 9, the first system hierarchy level is not shown for each component part shown and the second system hierarchy level is not shown for each subcomponent shown. This is not intended to have any limiting effect.

The individual blocks which the structure comprises have associated installation states and installation diagnosis reports which represent the installation states. Thus, by way of example, the block 60/180 has the associated installation state "motor overload" and the associated installation diagnosis report "motor overloaded". The blocks 62/184 and 64/182 have a plurality of associated installation states. A first installation state "cylinder position" with the two installation diagnosis reports "cylinder is not retracted" and "cylinder is not extended". A second installation state "end position switch" with the installation diagnosis report "Both end position switches operated". A third installation state "signal state" with the installation diagnosis report "Invalid input/output signal". A fourth installation state "Time condition" with the two installation diagnosis reports "Retraction time exceeded" and "Extension time exceeded". The blocks 24/120, 48/150 and 66/180 have two associated installation states. A first installation state "State" with the installation diagnosis report "Actuated" and a second installation state "Confirmation" with the installation diagnosis report "No confirmation".

On the basis of the hierarchic structure, installation states which occur in a block on the second system hierarchy level, for example, can be forwarded to the associated block on the first system hierarchy level or even on the topmost system hierarchy level.

Figure 10:
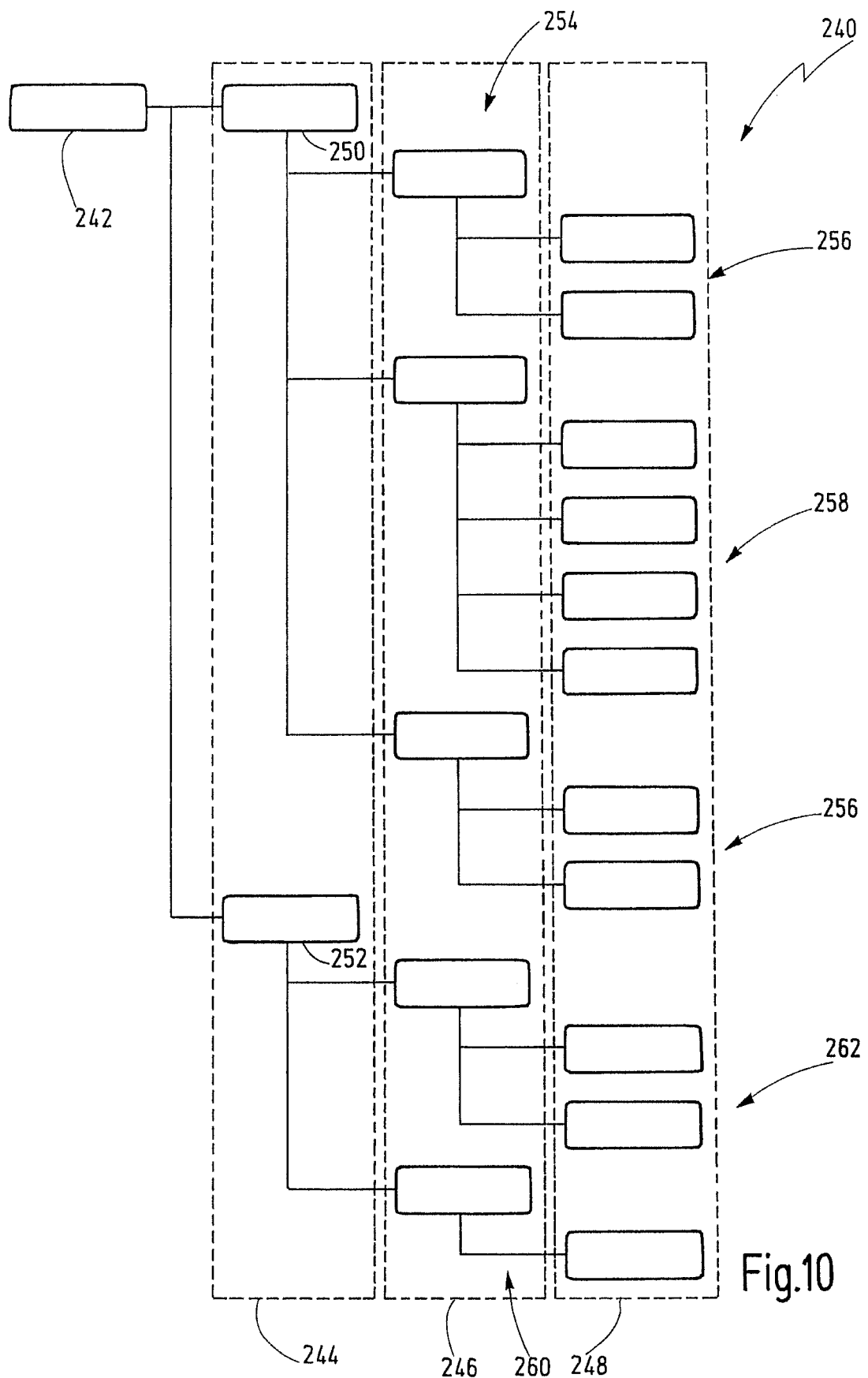
FIG. 10 shows an overview illustration of the hierarchic structure of a safety controller.

In FIG. 10, a second hierarchic structure is denoted as a whole by the reference numeral 240. This second hierarchic structure reproduces the design of the control hardware components 68 which the safety controller contains, allowing for the third emergency-off pushbutton switch 66. That is to say those control hardware components which are associated with the drilling module 44. The restriction to the drilling module 44 is not intended to have any limiting effect. It goes without saying that an appropriate hierarchic structure can be specified for the entire safety controller which is used to control the system 10.

The reference numeral 242 denotes a logic unit which executes that portion of the user program which is used to control the drilling module 44. The logic unit 242 defines a topmost control hierarchy level. The reference numeral 244 denotes a first control hierarchy level which is situated directly below the topmost hierarchy level. The reference numeral 246 denotes a second control hierarchy level which is situated directly below the first control hierarchy level. The reference numeral 248 denotes a third control hierarchy level which is situated directly below the second control hierarchy level.

The first control hierarchy level 244 comprises a standard bus unit 250, which is associated with the standard control aspect, and a safety bus unit 252, which is associated with the safety control aspect. These two bus units are used to perform the data transmission, separated according to safety-related and process-related data.

The second control hierarchy level 246 comprises a first plurality 254 of input/output modules which are connected to the standard bus unit 250. These input/output modules provide a plurality 256 of standard outputs which can be used to output control output signals for the purpose of actuating actuators. In addition, these input/output modules provide a plurality 258 of standard inputs which can be used to receive control input signals.

The second control hierarchy level 246 also comprises a second plurality 260 of input/output modules which are connected to the safety bus unit 252. These input/output modules provide a plurality 262 of safety inputs and a plurality of safety outputs—not shown.

By way of example, the third control hierarchy level 248 may have the following associated system diagnosis reports: "Hardware fault", "Short circuit to 0 V", "Short circuit to 24 V". The second control hierarchy level 246 may have the following associated system diagnosis reports, for example: "Module missing", "Internal error", "Supply voltage error". Both the first control hierarchy level 244 and the topmost control hierarchy level may have the following associated system diagnosis reports, for example: "Internal error", "Supply voltage error". It goes without saying that the individual system diagnosis reports may be associated with the individual modules or units.

Figure 11:
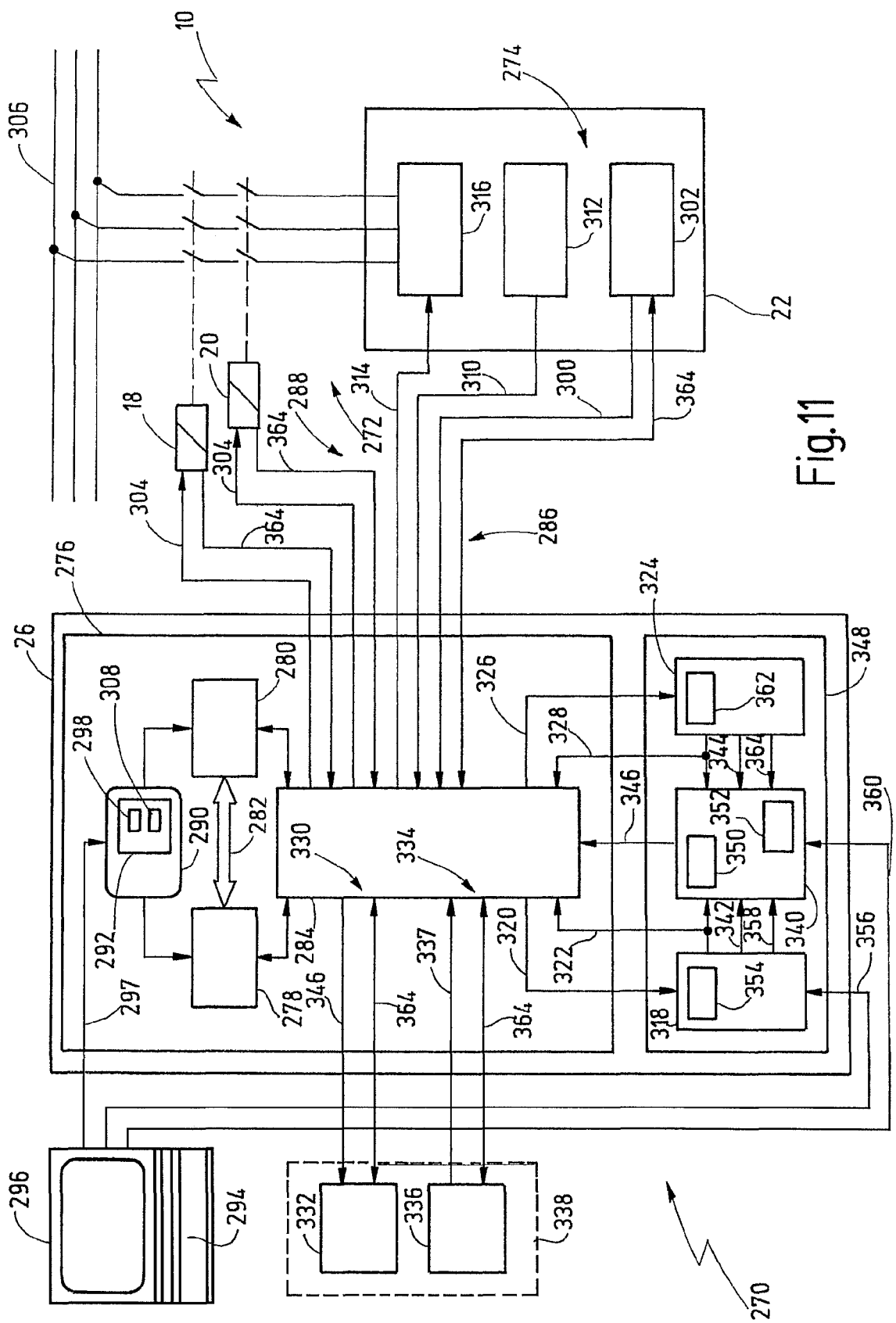
FIG. 11 shows a schematic illustration of a safety controller.

FIG. 11 shows a safety circuit which is denoted as a whole by the reference numeral 270 and which has a safety controller 26 which is designed to control an system denoted as a whole by the reference numeral 10. The system 10 comprises a plurality 272 of actuators and a plurality 274 of sensors. The loads which the system 10 comprises are denoted by the reference numeral 22.

The safety controller 26 comprises a control unit 276. The control unit 276 is of two-channel redundant design in order to achieve the requisite failsafety for controlling safety-critical processes. As a representation of the two-channel design, FIG. 11 shows two isolated processors 278, 280 which are connected to one another by means of a bidirectional communication interface 282 in order to be able to monitor one another and to interchange data. Preferably, the two channels of the control unit 276 and the two processors 278, 280 are diversitary, i.e. of different design from one another, in order to largely rule out systematic errors.

The reference numeral 284 denotes an input/output unit which is connected to each of the two processors 278, 280. The input/output unit 284 receives a plurality 286 of control input signals from the plurality 274 of sensors and forwards said signals in an adjusted data format to each of the two processors 278, 280. In addition, the input/output unit 284 takes the processors 278, 280 as a basis for producing a plurality 288 of control output signals which are used to actuate the plurality 272 of actuators.

The reference numeral 290 denotes a chip card which is used to store a user program 292. The user program 292 is written using a programming tool. By way of example, the programming tool is a computer program 294 which can be executed on a conventional PC 296. In this case, the use as a chip card 290 as a storage medium allows simple interchange of the user program 292 even without direct connection to the PC 296 on which the programming tool is executed. Alternatively, the user program 292 may also be stored in a memory, for example an EEPROM, which is permanently installed in the control unit 276. The loading of the user program 292 onto the chip card 290 is indicated by a line 297.

The user program 292 defines the control tasks to be performed by the safety controller 26. To this end, the user program 292 comprises a safety control module 298 in which those control tasks which are associated with the safety control aspect are performed. In the safety control module 298, safety-related control input signals 300 produced by safety sensors 302 associated with the safety control aspect are processed in failsafe fashion. By way of example, the safety sensors 302 are emergency-off pushbutton switches, two-hand controllers, guard doors, rotation speed monitoring appliances or other sensors for picking up safety-related parameters. In accordance with the associated control tasks in the safety control aspect, the safety-related control input signals 300 are taken as a basis for producing safety-related control output signals 304, which are used to actuate contactors 18, 20, what are known as safety actuators, i.e. actuators which are associated with the safety control aspect. The operating contacts of the contactors 18, 20 are arranged in the connection between a power supply 306 and the loads 22. The contactors 18, 20 can be used to disconnect the power supply for the loads 22, which means that it is possible to transfer the loads 22 to a safe state when a relevant malfunction occurs.

Furthermore, the user program 292 has a standard control module 308 which is used to perform those control tasks which are associated with the standard control aspect. To this end, the standard control module 308 is used to process process-related control input signals 310 which are produced by standard sensors 312. The standard sensors 312 are such sensors as detect input variables which are required for drive regulation, for example. By way of example, these may be rotation speeds, angles or speeds. On the basis of the process-related control input signals 310, process-related control output signals 314 are produced in accordance with the control tasks associated with the standard control aspect and are supplied to standard actuators 316. By way of example, the standard actuators 316 may be motors or control cylinders.

The design chosen in the exemplary embodiment for the user program 292, according to which said user program comprises a safety control module 298 and a standard control module 308, which is why the control unit 276 performs both control tasks which are associated with the safety control aspect and control tasks which are associated with the standard control aspect, is not intended to have any limiting effect. It goes without saying that it is also conceivable for the control unit 276 to perform merely control tasks which are associated with the safety control aspect. In this case, the user program 292 does not contain a standard control module 308.

The input/output unit 284 is also used for linking further components which the safety controller 26 comprises to the two processors 278, 280. Thus, a number 320 of installation diagnosis input signals are supplied to an installation diagnosis evaluation unit 318 from the input/output unit 284. The installation diagnosis evaluation unit 318 is designed to take the number 320 of installation diagnosis input signals as a basis for determining which of a plurality of installation states for the system 10 which is to be controlled is present at a first defined time. The installation diagnosis evaluation unit 318 produces a number 322 of installation state signals, wherein the number 322 of installation state signals represents a number of determined installation states, wherein the number of determined installation states are present at the first defined time. The number 322 of installation state signals are supplied to the input/output unit 284. Hence, the control unit 276 can take suitable measures in accordance with the determined installation states.

In addition, a number 326 of system diagnosis input signals are supplied to a system diagnosis evaluation unit 324 from the input/output unit 284. The system diagnosis evaluation unit 324 is designed to take the number 326 of system diagnosis input signals as a basis for determining which of a plurality of system states for the safety controller 26 is present at a second defined time, wherein the system diagnosis evaluation unit 324 is designed to produce a number 328 of system state signals, wherein the number 328 of system state signals represents a number of determined system states, wherein the number of determined system states are present at the second defined time. The number 328 of system state signals are supplied to the input/output unit 284. Hence, the control unit 276 can take suitable measures in accordance with the determined installation states.

In this case, a system state is intended to detect not only the units and components which the safety controller 26 comprises but also all units which are electrically connected to the safety controller 26. These are the safety sensors 302, the contactors 18, 20, in more general terms the safety actuators, the standard sensors 312, the standard actuators 316 and also a display unit that is yet to be described and a system diagnosis request unit that is yet to be described. In addition, the system state is intended to cover all wiring which is present between the safety controller 26 and the units listed above.

The safety controller 26 comprises an interface 330 for a display unit 332. The display unit 332 is designed to display diagnosis reports. In addition, the safety controller 26 comprises an interface 334 for a system diagnosis request unit 336, which is designed to detect a system diagnosis request 337. The display unit 332 and the system diagnosis request unit 336 can form a physical unit 338.

Furthermore, the safety controller 26 has a diagnosis reporting unit 340. The diagnosis reporting unit 340 is supplied with the number 322 of installation state signals and with the number 328 of system state signals. In addition, the diagnosis reporting unit 340 is supplied firstly with a number 342 of installation diagnosis reports, wherein the installation diagnosis reports represent the determined installation states. Secondly, the diagnosis reporting unit 340 is supplied with a number 344 of system diagnosis reports, wherein the system diagnosis reports represent the determined system states.

The diagnosis reporting unit provides a number of diagnosis reports for the number of determined installation states and for the number of determined system states, wherein at least for one of the determined installation states a diagnosis report is provided on the basis of said installation state and a number of associated system states which are comprised in the number of determined system states and which are associated with said installation state. The diagnosis reporting unit 340 produces a number 346 of diagnosis signals, wherein the number of diagnosis signals represent the number of diagnosis reports. The number 346 of diagnosis signals are supplied to the display unit 332 via the input/output unit 284 for the purpose of displaying the number of diagnosis reports.

The installation diagnosis evaluation unit 318, the system diagnosis evaluation unit 324 and the diagnosis reporting unit 340 are combined in a diagnosis unit 348.

The diagnosis reporting unit 340 has an association memory unit 350 which stores a plurality of association variables at least for a plurality of the plurality of installation states and at least for a plurality of the plurality of system states. The stored association variables indicate which of the plurality of system states is respectively associated with which of the plurality of installation states on the basis of a predefined association. A number of pairings for the number of determined system states and for the number of determined installation states have a number of stored association variables selected for them. Each of these selected association variables represents at least one of the pairings. The number of associated system states is determined on the basis of the number of association variables.

The diagnosis reporting unit 340 has a state memory unit 352 which is designed to repeatedly store determined installation states and determined system states. The diagnosis reporting unit 340 is designed to consider already stored determined system states and/or already stored determined installation states when establishing whether the system state to be stored is an associated system state and/or when establishing whether there are associated system states present for an installation state that is to be stored.

The installation diagnosis evaluation unit 318 has an installation diagnosis memory unit 354 which stores the plurality of installation states, the installation diagnosis reports representing the latter and an installation structure size. All of these are provided and transferred to the installation diagnosis memory unit 354 when the user program 392 is written, as indicated by a line 356. Alternatively, this information can also be transferred to the chip card 290 via the line 297 and forwarded by said chip card to the installation diagnosis memory unit 354. The system size is made available to the diagnosis reporting unit 340, as indicated by a line 358.

The association variables stored in the association memory unit 350 are likewise created and supplied to the association memory unit 350 when the user program 292 is written, as indicated by a line 360.

The system diagnosis evaluation unit 324 has a system diagnosis memory unit 362 which stores the plurality of system states and also a number of system diagnosis reports, wherein the system diagnosis reports each represent one of the plurality of system states. This information is stored permanently and originates from the manufacturer of the safety controller 26. In addition, the system diagnosis memory unit 362 stores a control structure variable which is made available to the diagnosis reporting unit 340, as indicated by a line 364.

The input/output unit 284 is used to interchange test signals 364 between the safety controller 26 and the safety sensors 302, the contactors 18, 20, the display unit 332, the system diagnosis request unit 336. The test signals 364 can be used in the safety controller 26 to determine whether the units and components connected to the latter are operating correctly, which is necessary, since it must be ensured that the system 10 to be controlled is in a safe state as soon as a malfunction occurs on an appliance connected to the safety controller 26.

What is claimed is:

1. A safety controller for controlling an automated installation in accordance with a user program that defines a plurality of installation states of the installation, said installation having a plurality of physical hardware components comprising logic components, a number of sensors and a number of actuators connected to the safety controller so as to form a controller system, the safety controller comprising:
   a control unit to which a plurality of control input signals from the plurality of sensors are supplied, wherein the control unit is designed to produce a plurality of control output signals on the basis of the control input signals in accordance with the user program, wherein the plurality of control output signals are used to actuate the plurality of actuators in order to adopt one of the plurality of installation states,
   a display unit for displaying diagnosis reports,
   an installation diagnosis evaluation unit to which a number of installation diagnosis input signals are supplied, wherein the installation diagnosis evaluation unit produces a number of installation state signals on the basis of the installation diagnosis input signals, the installation state signals identifying any logical errors in the operation of the automated installation existent at a first defined moment of time,
   a safety system diagnosis evaluation unit to which a number of safety system diagnosis input signals are supplied, wherein the safety system diagnosis evaluation unit produces a number of safely system state signals on the basis of the number of safety system diagnosis input signals, the safety system state signals identifying any physical errors in any of the physical hardware components of the automated installation at a second defined moment of time,
   a diagnosis report unit to which the installation state signals and the safety system state signals are supplied,
   wherein the diagnosis report unit produces a number of diagnosis signals depending on the installation state signals, depending on the safety system state signals, and depending on predefined associations between said logical errors and said physical errors,
   wherein said diagnosis signals represent a number of diagnosis reports, which are a result of a combination of both the logical errors and associated physical errors wherein the diagnosis signals are supplied to the display unit for the purpose of displaying the diagnosis reports,
   wherein the diagnosis report unit has an association memory which stores a plurality of predefined association variables associating the logical errors and the physical errors, wherein each association variable represents a defined pairing between a logical error and at least one associated physical error which can cause the logical error, and wherein the diagnosis report unit is designed to determine which diagnosis signals to produce on the basis of the association variables; and further wherein the association variables are defined by the user program, and
   wherein the control unit has a plurality of inputs for receiving input signals from the sensors and a plurality of outputs for providing output signals to the actuators, wherein the user program comprises a plurality of input variables, a plurality of output variables and an I/O mapping defining individual relationships between said input signals from the sensors and said input variables and between said output signals to the actuators and said output variables, with said association variables being defined depending on the I/O mapping, wherein said installation state signal is determined based on said input variable and said physical errors comprises an error in said input signal from the sensors.

2. The safety controller of claim 1, wherein the diagnosis report unit is designed to suppress a diagnosis report indicating a logical error, when the logical error is associated with a number of physical errors, and to produce diagnosis signals representing the physical errors only.

3. The safety controller of claim 1, wherein the diagnosis report unit is designed to send diagnosis signals to the display unit in such a manner that the diagnosis signals represent an integrated combination diagnosis report comprising both a logical errors report and a number of physical errors reports which are associated with said logical errors report.

4. The safety controller of claim 1, further comprising a system diagnosis request unit associated with the display unit, wherein the system diagnosis request unit is designed to request a system diagnosis report for displaying.

5. The safety controller of claim 1, wherein the installation diagnosis evaluation unit is designed to repeatedly determine which of the plurality of installation states is present at a plurality of instances of time.

6. The safety controller of claim 5, wherein the system diagnosis evaluation unit is designed to repeatedly determine which of the plurality of safety system states is present at a plurality of instances of time.

7. The safety controller of claim 6, wherein the diagnosis report unit has a state memory unit designed to repeatedly store said installation states and said safety system states determined by the installation diagnosis evaluation unit and the safety system diagnosis evaluation unit in order to form a history of installation states and safety system states.

8. The safety controller of claim 7, wherein the diagnosis report unit is designed to use the history of installation states and safety system states for producing the number of diagnosis signals.

9. The safety controller of claim 1, wherein the user program comprises a plurality of individual software components each controlling one of the plurality of installation hardware components, and wherein the plurality of installation states and safety system states are associated with the individual software components.

10. The safety controller of claim 9, wherein the diagnosis reports are associated with the individual software components.

11. The safety controller of claim 9, wherein the user program has a hierarchically structured design defining a plurality of hierarchical levels of software components, and wherein the diagnosis report unit is designed to produce the number of diagnosis signals further depending on the hierarchical levels by providing a collective diagnosis report representing consolidated installation states and safety system states for a plurality individual software components.

12. The safety controller of claim 1, wherein said second defined moment in time is substantially the same as said first defined moment in time.

13. A method for controlling an automated installation in accordance with a user program that defines a plurality of installation states of the installation, said installation having a plurality of physical hardware components comprising logic components, a number of sensors and a number of actuators connected to a safety controller so as to form a controller system, the method comprising the steps of:
receiving a plurality of control input signals from the plurality of sensors at the safety controller,
producing a plurality of control output signals in response to the control input signals in accordance with the user program executed on the safety controller, and
providing the control output signals to the plurality of actuators in order to adopt one of the plurality of installation states,
producing a number of installation state signals identifying any logical errors in the operation of the automated installation existent at a first defined moment of time,
producing a number of safety system state signals identifying any physical errors in any of the physical hardware components of the automated installation at a second defined moment of time,
providing a plurality of predefined association variables associating the logical errors and the physical errors, wherein each association variable represents a defined pairing between a logical error and at least one associated physical error which can cause the logical error,
producing a number of diagnosis signals depending on the installation state signals, depending on the safety system state signals, and depending on predefined associations between said logical errors and said physical errors, said diagnosis signals representing a number of diagnosis reports which are a result of a combination of both the logical errors and associated physical errors, wherein the diagnosis reports determine the diagnosis signals on the basis of the association variables,
supplying said diagnosis signals to a display unit for the purpose of displaying the diagnosis reports,
receiving input signals from the sensors and providing output signals to the actuators, and
providing a plurality of input variable, a plurality of output variables and an I/O mapping defining individual relationships between said input signals from the sensors and said input variables and between said output signals to the actuators and said output variables, with said association variables being defined depending on the I/O mapping, wherein said installation state signal is determined based on said input variable and said physical errors comprises an error in said input signal from the sensors.

14. The method of claim 13, wherein said second defined moment in time is substantially the same as said first defined moment in time.

15. A non-transitory computer readable storage medium containing a computer program having program code designed to be executed on a safety controller for controlling an automated installation having a plurality of installation states, said installation having a plurality of physical hardware component comprising a number of sensors and a number of actuators connected to a safety controller so as to form a controller system, and the computer program being designed to carry out a method comprising the steps of:
receiving a plurality of control input signals from the plurality of sensors at the safety controller,
producing a plurality of control output signals in response to the control input signals, and
providing the control output signals to the plurality of actuators in order to adopt one of the plurality of installation states,
producing a number of installation state signals identifying any logical errors in the operation of the automated installation existent at a first defined moment of time,
producing a number of safety system state signals identifying any physical errors in any of the physical hardware components of the automated installation at a second defined moment of time,
providing a plurality of predefined association variables associating the logical errors and the physical errors, wherein each association variable represents a defined pairing between a logical error and at least one associated physical error which can cause the logical error,
producing a number of diagnosis signals depending on the installation state signals, depending on the safety system state signals, and depending on predefined associations between said logical errors and said physical errors, said diagnosis signals representing a number of diagnosis reports which are a result of a combination of both the logical errors and associated physical errors, wherein the diagnosis reports determine the diagnosis signals on the basis of the association variables,
supplying said diagnosis signals to a display unit for the purpose of displaying the diagnosis reports,
receiving input signals from the sensors and providing output signals to the actuators, and
providing a plurality of input variable, a plurality of output variables and an I/O mapping defining individual relationships between said input signals from the sensors and said input variables and between said output signals to the actuators and said output variables, with said association variables being defined depending on the I/O mapping, wherein said installation state signal is determined based on said input variable and said physical errors comprises an error in said input signal from the sensors.

16. The non-transitory computer readable storage medium of claim 15, wherein said second defined moment in time is substantially the same as said first defined moment in time.

* * * * *